US010178655B2

(12) United States Patent
Yang et al.

(10) Patent No.: US 10,178,655 B2
(45) Date of Patent: Jan. 8, 2019

(54) METHOD AND DEVICE FOR TRANSMITTING UPLINK CONTROL INFORMATION

(71) Applicant: ZTE Corporation, Shenzhen (CN)

(72) Inventors: Weiwei Yang, Shenzhen (CN); Bo Dai, Shenzhen (CN); Shuqiang Xia, Shenzhen (CN); YuNgok Li, Shenzhen (CN); Yajun Zhao, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 220 days.

(21) Appl. No.: 14/914,581

(22) PCT Filed: May 8, 2014

(86) PCT No.: PCT/CN2014/077059
§ 371 (c)(1),
(2) Date: Feb. 25, 2016

(87) PCT Pub. No.: WO2014/173333
PCT Pub. Date: Oct. 30, 2014

(65) Prior Publication Data
US 2016/0219577 A1  Jul. 28, 2016

(30) Foreign Application Priority Data

Aug. 27, 2013 (CN) .......................... 2013 1 0379504

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/1854* (2013.01); *H04L 1/1861* (2013.01);
(Continued)

(58) Field of Classification Search
None
See application file for complete search history.

(56) References Cited

U.S. PATENT DOCUMENTS 9,615,267 B2 *  4/2017  Fu .......................... H04W 24/02
2012/0134305 A1 *  5/2012  Damnjanovic ....... H04L 1/1607
                                                         370/280
(Continued)

FOREIGN PATENT DOCUMENTS

CN       101567766 A        10/2009
CN       101742665 A         6/2010
(Continued)

OTHER PUBLICATIONS

International Search Report in international application number: PCT/CN2014/077059, dated Aug. 4, 2014.
(Continued)

*Primary Examiner* — Chi H Pham
*Assistant Examiner* — Vladislav Y Agureyev
(74) *Attorney, Agent, or Firm* — Oppedahl Patent Law Firm LLC

(57) ABSTRACT

Disclosed are a method and device for transmitting uplink control information. The method comprises: dividing uplink sub-frames in a radio frame into N groups and dividing all downlink serving cells into M groups; determining the corresponding relationship between the M groups downlink serving cells and the N groups uplink subframes; according to the determined corresponding relationship, transmitting by a terminal, on the uplink sub-frames, the uplink control information of the corresponding downlink serving cells required to be transmitted, wherein said M and N are both positive integers greater than 1, and M≥N.

21 Claims, 8 Drawing Sheets

(51) Int. Cl.
*H04L 5/00* (2006.01)
*H04L 5/14* (2006.01)

(52) U.S. Cl.
CPC .......... *H04L 1/1893* (2013.01); *H04L 5/0055* (2013.01); *H04L 5/14* (2013.01); *H04W 72/042* (2013.01)

(56) References Cited

U.S. PATENT DOCUMENTS

| | | | |
|---|---|---|---|
| 2012/0257531 A1 | 10/2012 | Ko | |
| 2013/0044653 A1* | 2/2013 | Yang | H04L 1/1671 370/280 |
| 2013/0223300 A1* | 8/2013 | Yang | H04L 1/1861 370/280 |
| 2013/0294423 A1* | 11/2013 | Wang | H04N 21/2365 370/336 |
| 2014/0036814 A1* | 2/2014 | Zhang | H04W 72/04 370/329 |
| 2014/0036856 A1* | 2/2014 | Park | H04L 1/1671 370/329 |
| 2014/0092824 A1* | 4/2014 | He | H04W 52/0258 370/329 |
| 2014/0119313 A1* | 5/2014 | Yang | H04W 74/0833 370/329 |
| 2015/0124727 A1* | 5/2015 | Yan | H04L 1/1635 370/329 |

FOREIGN PATENT DOCUMENTS

| | | | |
|---|---|---|---|
| CN | 101925113 A | 12/2010 | |
| CN | 101958775 A | 1/2011 | |
| CN | 102075309 A | 5/2011 | |
| CN | 102164414 A | 8/2011 | |
| CN | 102265529 A | 11/2011 | |
| CN | 102291227 A | 12/2011 | |
| CN | 102355339 A | 2/2012 | |
| CN | 102355733 A | 2/2012 | |
| CN | 102468937 A | 5/2012 | |
| CN | 102480338 A | 5/2012 | |
| CN | 102684855 A | 9/2012 | |
| CN | 102752085 A | 10/2012 | |
| CN | 102938693 A | 2/2013 | |
| CN | 102598741 B | 3/2015 | |
| WO | 2010122722 A1 | 10/2010 | |
| WO | 2011084038 A2 | 7/2011 | |
| WO | 2012057571 A2 | 5/2012 | |
| WO | WO 2013002576 A3 * | 2/2013 | ........ H04W 74/0833 |
| WO | WO 2013166723 A1 * | 11/2013 | ........... H04L 1/1635 |

OTHER PUBLICATIONS

English Translation of the Written Opinion of the International Search Authority in international application number: PCT/CN2014/077059, dated Aug. 4, 2014.

* cited by examiner

METHOD AND DEVICE FOR TRANSMITTING UPLINK CONTROL INFORMATION

TECHNICAL FIELD

The disclosure relates to the field of radio communications, and in particular to a method and a device for transmitting uplink control information.

BACKGROUND

Radio frames in a Long Term Evolution (LTE) system and an LTE-Advanced (LTE-A) system include frame structures with a Frequency Division Duplex (FDD) mode and a Time Division Duplex (TDD) mode. FIG. 1 is a diagram of a frame structure in the existing LTE/LTE-A FDD system. As shown in FIG. 1, one radio frame with the length of 10 ms consists of twenty time slots each being 0.5 ms in length and numbered from 0 to 19; the time slots $2i$ and $2i+1$ form a subframe-i with the length of 1 ms. FIG. 2 is a diagram of a frame structure in the existing LTE/LTE-A TDD system; one radio frame with the length of 10 ms consists of two half frames each with the lengths of 5 ms; each half frame includes 5 subframes with the length of 1 ms; the subframe-i is defined as two time slots $2i$ and $2i+1$ each with the length of 0.5 ms.

In the above two types of frame structures, for a Normal Cyclic Prefix (NCP), one time slot includes 7 symbols with the length of 66.7 microseconds (us), in which the CP length of the first symbol is 5.21 us, and the CP length of the other 6 symbols is 4.69 us; for an Extended Cyclic Prefix (Extended CP), one time slot includes 6 symbols, and the CP length of all the symbols is 16.67 us. Supported uplink and downlink configuration is as shown in Table 1:

TABLE 1

| Uplink-downlink configuration | Downlink-uplink conversion point period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

For each subframe in one radio frame, "D" represents a subframe for downlink transmission; "U" represents a subframe for uplink transmission; "S" represents a special subframe, which includes three parts, a Downlink Pilot Time Slot (DwPTS), a Guard Period (GP) and an Uplink Pilot Time Slot (UpPTS).

In the LTE system, a Hybrid Automatic Repeat reQuest (HARQ) progress refers to: when a transmitting end has data to be transmitted, a receiving end allocates information, such as time-frequency resource and packet information, which is required for transmission for the transmitting end through a downlink signalling. The transmitting end transmits data according to these pieces of information, and saves the data into its own buffer to facilitate retransmission. The receiving end performs detection after receiving the data, and if the data are correctly received, the receiving end transmits an Acknowledgment (ACK) to the transmitting end; after receiving the ACK, the transmitting end clears a buffering memory used in this transmission, and ends this transmission. If the data are not correctly received, the receiving end transmits a Non-acknowledgment (NACK) to the transmitting end, and saves a wrongly received packet into a buffer of the receiving end; after receiving the NACK information, the transmitting end extracts the data from its own buffer, and performs retransmission with a specific packet format in a corresponding subframe and at a corresponding frequency domain position. After receiving the retransmitted packet, the receiving end combines the retransmitted packet with the wrongly received packet, and performs detection again. The process above is repeated until the data are correctly received or the number of transmission times exceeds a maximum threshold of the number of transmission times.

In the LTE/LTE-A system, there are provisions below on scheduling and timing of a Physical Downlink Shared CHannel (PDSCH) in the downlink HARQ, that is, there are provisions below on the scheduling of the downlink HARQ: User Equipment (UE) detects a Physical Downlink Control CHannel (PDCCH) on the subframe n, and analyzes the PDSCH of the current subframe according to information of the PDCCH.

In the LTE/LTE-A FDD system, there is a timing rule below on a Physical Uplink Control CHannel) corresponding to the HARQ-ACK for the sent PDSCH in the downlink HARQ, that is, there is a rule below on a timing of the downlink HARQ: the UE detects the PDSCH transmission or instructs the PDCCH of a downlink SPS release on the subframe n, and transmits a corresponding HARQ-ACK on the subframe n+4. In the LTE/LTE-A TDD system, there is a rule below on the timing of the downlink HARQ: the UE detects the PDSCH transmission or instructs the PDCCH of the downlink SPS release on the subframe n-k, and transmits a corresponding HARQ-ACK on the uplink subframe n, wherein k belongs to K. Table 2 includes values of K in different uplink and downlink configurations. The values of K are as shown in Table 2:

TABLE 2

| Uplink-downlink configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the LTE FDD system, the uplink subframes and the downlink subframes are in one-to-one correspondence. Thus, when the PDSCH includes only one transmission block, the UE will feed back ACK/NACK information of 1 bit; when the PDSCH includes two transmission blocks, the UE will feed back ACK/NACK information of 2 bits; the UE adopts PUCCH format 1a/1b to transmit the ACK/NACK information of 1/2bits. In the TDD, the uplink subframes and the downlink subframes are not in one-to-one correspondence, that is, the ACK/NACK information corresponding to a plurality of downlink subframes needs to be transmitted on the PUCCH channel of one uplink subframe, wherein the downlink subframes corresponding to the uplink subframe are gathered to form a "bundling window". There are two solutions for transmitting the ACK/NACK information. One solution is a bundling method, and the core idea of the solution is to perform logic and operation on the ACK/NACK information corresponding to the transmission blocks for the respective downlink subframes which needs to be fed back on the uplink subframe. If one downlink subframe has 2 transmission blocks, the UE will feed back ACK/NACK information of 2 bits; if each subframe has only one transmission block, the UE will feed back ACK/NACK information of 1 bit; the UE adopts PUCCH format 1 a/1 b to transmit the ACK/NACK message of 1/2bits. Another solution is a multiplexing with channel selection method, and the core idea of the solution is to adopt different PUCCH channels and different modulation symbols on the PUCCH channels to express different feedback states of the downlink subframes needing to be fed back on the uplink subframe. If a downlink subframe has a plurality of transmission blocks, the ACK/NACK corresponding to the multiple transmission blocks of the downlink subframe is subjected to logic AND (spatial bundling), and then subjected to channel selection; the UE adopts format 1 b with channel selection to transmit the ACK/NACK message.

Relative to the LTE system, the LTE-A system has a most outstanding characteristic that a carrier aggregation technology is introduced into the LTE-A system, that is, the bandwidth of the LTE system is aggregated to obtain a larger bandwidth. In the system with carrier aggregation, a carrier for aggregation is either called a Component Carrier (CC) or a Serving Cell (SC). In addition, concepts of a Primary Component Carrier/Cell (PCC/PCell) and a Secondary Component Carrier/Cell (SCC/SCell) are further provided. The system in which carrier aggregation is performed at least includes a primary serving cell and a secondary serving cell, in which the primary serving cell is always in an activated state, and it is specified that the PUCCH is only transmitted on the Pcell.

Under the LTE-A carrier aggregation system, when the HARQ-ACK message is transmitted on the PUCCH, two transmitting modes are defined: PUCCH format 1b with channel selection, and PUCCH format 3. For the UE with a plurality of serving cells, if the UE can only support the aggregation of 2 serving cells at most, then when there are multiple serving cells configured for the UE, the UE will adopt the PUCCH format 1b with channel selection mode to transmit the HARQ-ACK. If the UE can support the aggregation of more than 2 serving cells, then when there are multiple serving cells configured for the UE, a base station will further adopt a high signalling to configure whether the UE adopts the PUCCH format 1b with channel selection mode or the PUCCH format 3 to transmit the HARQ-ACK response information.

The inventor of the disclosure has found at least the following technical problems in the existing technology in the process of implementing the technical solutions of the embodiments of the disclosure:

In the subsequent version, a dual connectivity technology is introduced, that is, the uplink control information is transmitted under the condition that the backhaul among a plurality of aggregated/collaborated serving cells is in a non-ideal state, so the existing technique in which the PUCCH is transmitted only on the Pcell is not situtable, and there is no effective solution at present.

SUMMARY

In view of this, the embodiments of the disclosure is intended to provide a method and a device for transmitting uplink control information, which can at least solve the problem in the situation that the uplink control information is transmitted under the condition that the backhaul among the multiple serving cells is in a non-ideal state.

The technical solutions of the disclosure are implemented as follows.

A method for transmitting uplink control information includes:

grouping uplink subframes in a radio frame into N groups, and grouping all downlink serving cells into M groups;

determining a corresponding relation between the M groups of downlink serving cells and the N groups of uplink subframes; and transmitting, by a terminal, uplink control information corresponding to the downlink serving cells, on the uplink subframes according to the determined corresponding relation, wherein M and N are both positive integers greater than 1, and M is greater than or equal to N, wherein determining the corresponding relation between the M groups of downlink serving cells and the N groups of uplink subframes comprises: determining the corresponding relation according to at least one of the following pre-configuration modes:

mode I: determining the corresponding relation according to a preset corresponding relation;

mode II: determining the corresponding relation according to a corresponding relation configured by a signalling;

mode III: determining the corresponding relation according to a corresponding relation between a downlink serving cell group index and an uplink subframe group index;

mode IV: determining the corresponding relation according to a corresponding relation between the types of the downlink serving cells and the types of the uplink subframes;

mode V: determining the corresponding relation according to a feedback relation between a subframe on which a Physical Downlink Shared CHannel (PDSCH) of a downlink serving cell is located and a Hybrid Automatic Repeat reQuest Acknowledgement (HARQ-ACK) corresponding to the PDSCH.

In the above solution, grouping the uplink subframes in a radio frame into N groups may include: performing grouping according to at least one of the following group configuration modes:

mode I: grouping according to subframe indexes;

mode II: grouping according to the uplink subframes included in each group indicated by a signalling;

mode III: grouping according to the quantity of the downlink serving cells and/or the types of the downlink serving cells;

mode IV: grouping according to a feedback relation between a subframe where Downlink Control Information (DCI) corresponding to the PDSCH of a downlink serving cell is located and the HARQ-ACK corresponding to the PDSCH.

In the above solution, the grouping according to subframe indexes may include: performing grouping according to at least one of the following subframe configuration modes:

mode I: taking those with odd subframe indexes into one group, and taking those with even subframe indexes into another group;

mode II: taking those with the subframe indexes of the first half frame into one group, and taking those with the subframe indexes of the second half frame into another group;

mode III: taking appointed subframes into one group, and taking the rest subframes into another group.

In the above solution, grouping all downlink serving cells into M groups may include: performing grouping according to at least one of the following cell configuration modes;

mode I: grouping according to a backhaul type;

mode II: grouping according to the types of the serving cells;

mode III: grouping according to the serving cell included in each group indicated by a signalling;

mode IV: self-adaptively grouping according to a transmission situation of the DCI corresponding to the PDSCH of a downlink serving cell.

In the above solution, grouping according to the types of the serving cells may include:

taking primary serving cells into one group, and taking secondary serving cells into another group, or taking serving cells corresponding to a same frequency band into one group, or when the serving cells are Frequency Division Duplex (FDD) serving cells and Time Division Duplex (TDD) serving cells, taking the FDD serving cells into one group, and taking the TDD serving cells into another group, or taking downlink serving cells corresponding to the uplink serving cells of a same Timing Advance Group (TAG) into one group.

In the above solution, transmitting the uplink control information to be transmitted corresponding to the downlink serving cells on the uplink subframes according to the determined corresponding relation may include: selecting the uplink serving cells where the uplink subframes that transmit the uplink control information are located.

In the above solution, selecting the uplink serving cells where the uplink subframes that transmit the uplink control information are located may include: determining the uplink serving cells selected for transmission according to any one of the following cell determination modes:

mode I: performing determination according to a downlink serving cell where the PDSCH corresponding to the uplink control information is located or the uplink serving cells corresponding to the downlink serving cell group;

mode II: performing determination according to a downlink serving cell where the DCI corresponding to the PDSCH which corresponds to the uplink control information is located or the uplink serving cells corresponding to the downlink serving cell group;

mode III: taking the uplink serving cells as the primary serving cells.

In the above solution, transmitting the uplink control information corresponding to the downlink serving cells on the uplink subframes according to the determined corresponding relation may include:

when the uplink control information to be transmitted is an HARQ-ACK, determining an HARQ-ACK to be transmitted according to an existing timing relation and the uplink subframes; or when the uplink control information to be transmitted is an HARQ-ACK, determining an HARQ-ACK to be transmitted according to a new timing relation and the uplink subframes.

In the above solution, the new timing relation may be that the HARQ-ACK corresponding to the PDSCH on a subframe numbering n of a downlink serving cell is transmitted on an uplink subframe numbering n+k in an uplink subframe group corresponding to a downlink serving cell group where the downlink serving cell is located.

In the above solution, the new timing relation may be that, for a downlink serving cell of an FDD system, feedback timing is grouped according to uplink subframes in an uplink subframe group corresponding to a downlink serving cell group where the downlink serving cell is located, wherein different downlink subframes in the downlink serving cell group is regrouped according to the uplink subframes in the uplink subframe group corresponding to the downlink serving cell group.

In the above solution, transmitting, by the terminal, the uplink control information to be transmitted corresponding to the downlink serving cells on the uplink subframes according to the determined corresponding relation may further include:

when there are Physical Uplink Shared CHannels (PUSCH) of other uplink subframes needing to be transmitted in the subframe group corresponding to the uplink subframe, and the downlink serving cell corresponding to the uplink serving cell where the uplink subframe is located and the downlink serving cells corresponding to the uplink serving cells where the other uplink subframes are located belong to a same downlink serving cell group, transmitting the uplink control information on the PUSCH, or when there are PUSCH of other uplink subframes needing to be transmitted in the subframe group corresponding to the uplink subframe, and the downlink serving cell corresponding to the uplink serving cell where the uplink subframe is located and the downlink serving cells corresponding to the uplink serving cells where the other uplink subframes are located do not belong to a same downlink serving cell group, transmitting the uplink control information on a Physical Uplink Control CHannel (PUCCH), or when there are PUSCH of other uplink subframes needing to be transmitted in the subframe group corresponding to the uplink subframe, and the downlink serving cell corresponding to the uplink serving cell where the uplink subframe is located and the downlink serving cells corresponding to the uplink serving cells where part of the other uplink subframes are located belong to a same downlink serving cell group, transmitting the uplink control information on the PUSCH, or when there are PUSCH of other uplink subframes needing to be transmitted in the subframe group corresponding to the uplink subframe, configuring, by a signalling, whether the uplink control information is transmitted on the PUCCH or on the PUSCH.

A device for transmitting uplink control information, located at the terminal side, includes:

a grouping unit configured to group uplink subframes in a radio frame into N groups, and group all downlink serving cells into M groups;

a determination unit configured to determine a corresponding relation between the M groups of downlink serving cells and the N groups of uplink subframes; and a transmission unit configured to transmit uplink control information corresponding to the downlink serving cells on the uplink subframes according to the determined corresponding relation, wherein M and N are both positive integers greater than 1, and M is greater than or equal to N, wherein the corresponding relation is determined according to at least one of the following pre-configuration modes:

mode I: the corresponding relation is determined according to a preset corresponding relation;

mode II: the corresponding relation is determined according to a corresponding relation configured by a signalling;

mode III: the corresponding relation is determined according to a corresponding relation between a downlink serving cell group index and an uplink subframe group index;

mode IV: the corresponding relation is determined according to a corresponding relation between the types of the downlink serving cells and the types of the uplink subframes;

mode V: the corresponding relation is determined according to a feedback relation between a subframe on which a Physical Downlink Shared CHannel (PDSCH) of each downlink serving cell is located and a Hybrid Automatic Repeat reQuest Acknowledgement (HARQ-ACK) corresponding to the PDSCH.

In the above solution, the grouping unit may include a subframe grouping subunit configured to, when the uplink subframes in the radio frame is grouped into N groups, perform grouping according to at least one of the following group configuration modes:

mode I: grouping is performed according to subframe indexes;

mode II: grouping is performed according to the uplink subframes included in each group indicated by a signalling;

mode III: grouping is performed according to the quantity of the downlink serving cells and/or the types of the downlink serving cells;

mode IV: grouping is performed according to a feedback relation between a subframe where Downlink Control Information (DCI) corresponding to the PDSCH of a downlink serving cell is located and the HARQ-ACK corresponding to the PDSCH.

In the above solution, the subframe grouping subunit may be further configured to, when grouping is performed according to subframe indexes, perform grouping according to at least one of the following subframe configuration modes:

mode I: those with odd subframe indexes form one group, and those with even subframe indexes form another group;

mode II: those with the subframe indexes of the first half frame form one group, and those with the subframe indexes of the second half frame form another group;

mode III: appointed subframes form one group, and the rest subframes form another group.

In the above solution, the grouping unit may include a cell grouping subunit configured to, when all downlink serving cells are grouped into M groups, perform grouping according to at least one of the following cell configuration modes;

mode I: grouping is performed according to a backhaul type;

mode II: grouping is performed according to the types of the serving cells;

mode III: grouping is performed on the serving cells included in each group indicated by a signalling;

mode IV: grouping is self-adaptively performed according to a transmission situation of the DCI corresponding to the PDSCH of a downlink serving cell.

In the above solution, the cell grouping subunit may be further configured to, when grouping is performed according to the types of the serving cells, take primary serving cells as one group, and take secondary serving cells as another group, or take serving cells corresponding to a same frequency band as one group, or when the serving cells are FDD (Frequency Division Duplex) serving cells and TDD (Time Duplex Division) serving cells, take the FDD serving cells as one group, and take the TDD serving cells as another group, or take the downlink serving cells corresponding to the uplink serving cells of a same Timing Advance Group (TAG) as one group.

In the above solution, the determination unit may be further configured to, when uplink control information corresponding to the downlink serving cells is transmitted on the uplink subframes according to the determined corresponding relation, select the uplink serving cells where the uplink subframes that transmit the uplink control information are located.

In the above solution, the determination unit may be further configured to, when it is selected the uplink serving cells where the uplink subframes that transmit the uplink control information are located, determine the uplink serving cells selected for transmission according to any one of the following cell determination modes:

mode I: determination is implemented according to a downlink serving cell where the PDSCH corresponding to the uplink control information is located or the uplink serving cells corresponding to the downlink serving cell group;

mode II: determination is implemented according to a downlink serving cell where the DCI corresponding to the PDSCH which corresponds to the uplink control information is located or the uplink serving cells corresponding to the downlink serving cell group;

mode III: the uplink serving cells are the primary serving cells.

In the above solution, the determination unit may be further configured to, when the uplink control information corresponding to the downlink serving cells is transmitted on the uplink subframes according to the determined corresponding relation, in the case that the uplink control information to be transmitted is an HARQ-ACK, determine an HARQ-ACK to be transmitted according to an existing timing relation and the uplink subframes; or in the case that the uplink control information to be transmitted is an HARQ-ACK, determine an HARQ-ACK to be transmitted according to a new timing relation and the uplink subframes.

In the above solution, the new timing relation may be that the HARQ-ACK corresponding to the PDSCH on a subframe numbering n of the downlink serving cell is transmitted on an uplink subframe numbering n+k in an uplink subframe group corresponding to a downlink serving cell group where the downlink serving cell is located.

In the above solution, the new timing relation may be that, for a downlink serving cell of an FDD system, feedback timing is grouped according to uplink subframes in an uplink subframe group corresponding to a downlink serving cell group where the downlink serving cell is located, wherein different downlink subframes in the downlink serving cell group is regrouped according to the uplink subframes in the uplink subframe group corresponding to the downlink serving cell group.

In the above solution, the transmission unit may be further configured to, when there are PUSCH of other uplink subframes needing to be transmitted in the subframe group corresponding to the uplink subframe, and the downlink serving cell corresponding to the uplink serving cell where the uplink subframe is located and the downlink serving cells corresponding to the uplink serving cells where the other uplink subframes are located belong to a same downlink serving cell group, transmit the uplink control information on the PUSCH, or when there are PUSCH of other uplink subframes needing to be transmitted in the subframe group corresponding to the uplink subframe, and the downlink serving cell corresponding to the uplink serving cell where the uplink subframe is located and the downlink serving cells corresponding to the uplink serving cells where the other uplink subframes are located do not belong to a same downlink serving cell group, transmit the uplink control information on a Physical Uplink Control CHannel (PUCCH), or when there are PUSCH of other uplink subframes needing to be transmitted in the subframe group corresponding to the uplink subframe, and the downlink serving cell corresponding to the uplink serving cell where the uplink subframe is located and the downlink serving cells corresponding to the uplink serving cells where part of the other uplink subframes are located belong to a same downlink serving cell group, transmit the uplink control information on the PUSCH, or when there are PUSCH of other uplink subframes needing to be transmitted in the subframe group corresponding to the uplink subframe, it is configured through a signalling whether the uplink control information is transmitted on the PUCCH or on the PUSCH.

The grouping unit, the determination unit, the transmission unit, the subframe grouping subunit and the cell grouping subunit may be implemented by adopting a Central Processing Unit (CPU), a Digital Signal Processor (DSP) or a Field-Programmable Gate Array during execution processing.

A device for receiving uplink control information, located at a base station side, includes:

a grouping configuration unit configured to group uplink subframes in a radio frame into N groups, and group all downlink serving cells into M groups;

a corresponding relation configuration unit configured to determine a corresponding relation between the M groups of downlink serving cells and the N groups of uplink subframes; and a receiving unit configured to receive uplink control information corresponding the downlink serving cells on the uplink subframes according to the determined corresponding relation, wherein M and N are both positive integers greater than 1, and M is greater than or equal to N, wherein when the determination unit is configured to determine a corresponding relation between the M groups of downlink serving cells and the N groups of uplink subframes, the corresponding relation is determined according to at least one of the following pre-configuration modes:

mode I: the corresponding relation is determined according to a preset corresponding relation;

mode II: the corresponding relation is determined according to a corresponding relation configured by a signalling;

mode III: the corresponding relation is determined according to a corresponding relation between a downlink serving cell group index and an uplink subframe group index;

mode IV: the corresponding relation is determined according to a corresponding relation between the types of the downlink serving cells and the types of the uplink subframes;

mode V: the corresponding relation is determined according to a feedback relation between a subframe on which a Physical Downlink Shared CHannel (PDSCH) of each downlink serving cell is located and a Hybrid Automatic Repeat reQuest Acknowledgement (HARQ-ACK) corresponding to the PDSCH.

The grouping configuration unit, the corresponding relation configuration unit and the receiving unit may be implemented as a CPU, a DSP or an FPGA during execution processing.

The embodiment of the disclosure groups uplink subframes in the radio frame into N groups, groups all downlink serving cells into M groups, determines the corresponding relation between the M groups of downlink serving cells and the N groups of uplink subframes, transmits according to the determined corresponding relation the uplink control information to be transmitted on the uplink subframes which corresponds to the downlink serving cells; M and N are both positive integers greater than 1, and M is greater than or equal to N. By the adoption of the embodiment of the disclosure, the corresponding relation between the M groups of downlink serving cells and the N groups of uplink subframes is determined, and the uplink control information is transmitted according to the determined corresponding relation, so that the problem in the situation that the uplink control information is transmitted under the condition that the backhaul among the multiple serving cells is in a non-ideal state can be solved at least.

DETAILED DESCRIPTION

The implementation of the technical solution is further described below in detail with the accompanying drawings.

A method for transmitting uplink control information according to the embodiment of the disclosure is suitable for most scenes where the uplink control information is transmitted according to a determined pre-configuration relation. For example, regarding the transmission of the uplink control information under the condition that backhaul among a plurality of aggregated/collaborated serving cells is in a non-ideal state, the existing method in which a Physical Uplink Control CHannel (PUCCH) is transmitted only on a Pcell is not suitable. If the method for transmission according to the embodiment of the disclosure is adopted, the problem of the transmission of the uplink control information under the condition that the backhaul among the multiple serving cells is in the non-ideal state can be solved at least. The method for transmission according to the embodiment of the disclosure is at least suitable for the transmission of the uplink control information under the condition that the backhaul among the multiple serving cells is in the non-ideal state; however, the method for transmitting the uplink control information, which is provided by the embodiment of the disclosure, is not limited to the specific scene that the backhaul among the multiple serving cells is in the non-ideal state.

Figure 1:
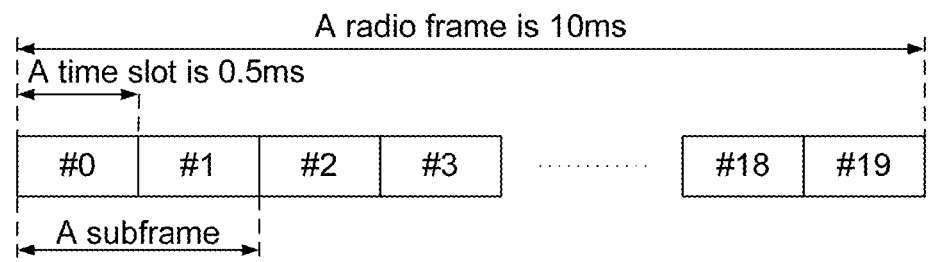
FIG. 1 is a diagram of a frame structure in a Frequency Division Duplex (FDD) system in the traditional art.
Figure 2:
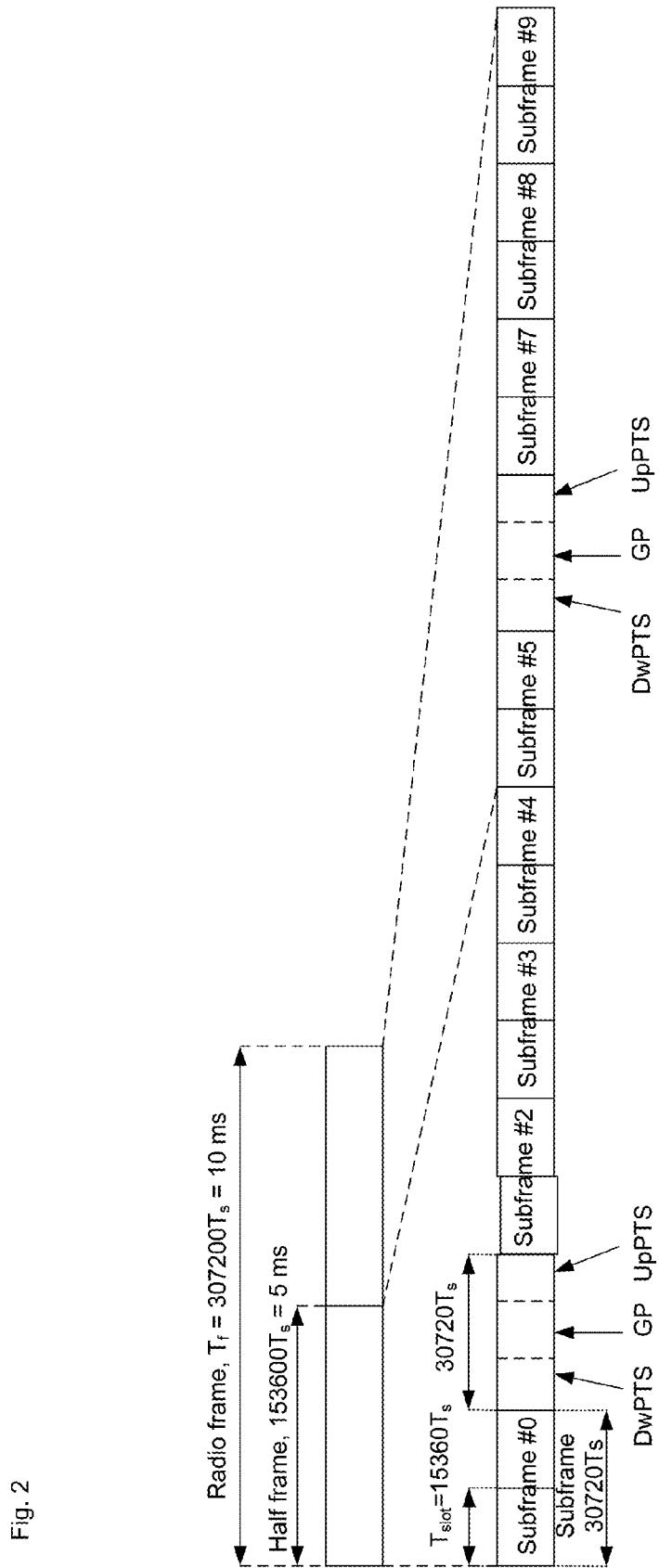
FIG. 2 is a diagram of a frame structure in a Time Division Duplex (TDD) system in the traditional art.
Figure 3:
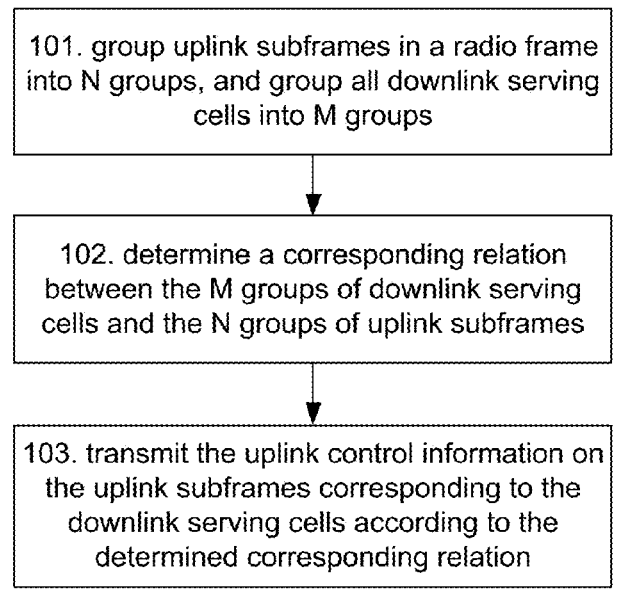
FIG. 3 is a flowchart of a method according to an embodiment of the disclosure.

A method for transmitting uplink control information according to the embodiment of the disclosure is as shown in FIG. 3, which includes the following steps.

Step 101: uplink subframes in a radio frame are grouped into N groups, and all downlink serving cells are grouped into M groups;

Step 102: a corresponding relation between the M groups of downlink serving cells and the N groups of uplink subframes is determined.

Here, the corresponding relation is determined according to at least one of the following pre-configuration modes:

mode I: according to a preset corresponding relation;

mode II: according to a corresponding relation configured by a signalling;

mode III: according to a corresponding relation between a downlink serving cell group index and an uplink subframe group index;

mode IV: according to a corresponding relation between the types of the downlink serving cells and the types of the uplink subframes;

mode V: according to a feedback relation between a subframe on which a Physical Downlink Shared CHannel (PDSCH) of a downlink serving cell is located and a Hybrid Automatic Repeat reQuest Acknowledgment (HARQ-ACK) corresponding to the PDSCH.

Step 103: according to the determined corresponding relation, the uplink control information corresponding to a serving cell is transmitted on an uplink subframe corresponding to the serving cell.

This step may be implemented by User Equipment (UE). The UE transmits, according to the determined corresponding relation, the uplink control information to be transmitted corresponding to a serving cell on the uplink subframe, wherein M and N are positive integers greater than 1, and M≥N.

Preferably, the step that uplink subframes in a radio frame are grouped into N groups is: the uplink subframes in the radio frame are grouped into the N groups according to at least one of the following grouping configuration modes:

mode I: grouping is performed according to subframe indexes;

mode II: grouping is performed according to the uplink subframes included in each group indicated by a signalling;

mode III: grouping is performed according to the quantity of the downlink serving cells and/or the types of the downlink serving cells;

mode IV: grouping is performed according to a feedback relation between a subframe where Downlink Control Information (DCI) corresponding to the PDSCH of a downlink serving cell is located and the HARQ-ACK corresponding to the PDSCH.

Preferably, the step that grouping is performed according to subframe indexes is: grouping is performed according to at least one of the following subframe configuration modes:

mode I: those with odd subframe indexes form one group, and those with even subframe indexes form one group;

mode II: those with the subframe indexes of the first half frame form one group, and those with the subframe indexes of the second half frame form one group;

mode III: appointed subframes form one group, and the rest subframes form one group, for example: the subframes of which the subframe indexes are {0, 1, 5, 6} form one group, the subframes of which the subframe indexes are {2, 3, 4, 7, 8, 9} form one group, or the subframes of which the subframe indexes are {0, 1, 8, 9} form one group, the subframes of which the subframe indexes are {2, 3, 4, 5, 6, 7} form one group.

Preferably, each group of uplink subframes is independent, and the independence of each group of uplink subframes refers to: one group of uplink subframe corresponds to a definition advance; or channels/signals on one group of uplink subframes correspond to a set of power control parameters.

Preferably, the step that all downlink serving cells are grouped into M groups is: all the serving cells are grouped into M groups according to at least one of the following cell configuration modes:

mode I: grouping is performed according to a backhaul type;

mode II: grouping is performed according to the types of the serving cells;

mode III: grouping is performed according to the serving cells included in each group indicated by a signalling;

mode IV: grouping is adaptively performed according to a transmission situation of the DCI corresponding to the PDSCH of a downlink serving cell.

Preferably, grouping performed according to the types of the serving cells is: primary serving cells form one group, and secondary serving cells form one group.

Preferably, grouping performed according to the types of the serving cells is: the serving cells corresponding to a same frequency band form one group.

Preferably, grouping performed according to the types of the serving cells is: when the serving cells are Frequency Division Duplex (FDD) serving cells and Time Division Duplex (TDD) serving cells, the FDD serving cells form one group, and the TDD serving cells form one group.

Preferably, grouping performed according to the types of the serving cells is: the downlink serving cells corresponding to the uplink serving cells of a same Timing Advance Group (TAG) form one group.

Preferably, the step that the UE transmits, according to the determined corresponding relation, the uplink control information corresponding to a serving cell on the uplink subframe further includes: the uplink serving cell where the corresponding uplink subframe that transmits the uplink control information is located is selected.

Preferably, the step that the uplink serving cell where the corresponding uplink subframe that transmits the uplink control information is located is selected includes one of the following contents:

mode I: determination is implemented according to an uplink serving cell corresponding to a downlink serving cell (or a downlink serving cell group) where the PDSCH corresponding to the uplink control information is located;

mode II: determination is implemented according to a uplink serving cell corresponding to a downlink serving cell (or a downlink serving cell group) where the DCI corresponding to the PDSCH corresponding to the uplink control information is located;

mode III: the uplink serving cells are the primary serving cells.

Preferably, when there are multiple downlink serving cells in the downlink serving cell group, the uplink serving cells corresponding to the downlink serving cell group are such uplink serving cells that correspond to the primary downlink serving cells in the downlink serving cell group.

Preferably, the uplink control information is one or more of the following: HARQ-ACK response information, CSI information and SR information.

Preferably, the step that the UE transmits according to the determined corresponding relation, the uplink control information to be transmitted corresponding to a serving cells on the uplink subframe is: when the uplink control information to be transmitted is an HARQ-ACK, an HARQ-ACK to be transmitted is determined according to the existing timing relation and the uplink subframes; or, when the uplink control information to be transmitted is an HARQ-ACK, an HARQ-ACK to be transmitted is determined according to a new timing relation and the uplink subframes.

Preferably, the new timing relation is that the HARQ-ACK corresponding to the PDSCH on the subframe n of the downlink serving cell is transmitted on the uplink subframe n+k in the uplink subframe group corresponding to the downlink serving cell group where the downlink serving cell is located, wherein k is greater than or equal to 4, and meets that the feedback delay is minimum.

Preferably, the new timing relation is that, for the downlink serving cells of the FDD system, feedback timing is grouped according to the available uplink subframes in the uplink subframe group corresponding to the downlink serving cell group where the downlink serving cell is located, wherein regrouping is performed on different downlink subframes in the downlink serving cell group according to the uplink subframes in the uplink subframe group corresponding to the downlink serving cell group.

A device for transmitting uplink control information is provided, which is located at the terminal side and includes:

a grouping unit configured to group uplink subframes in a radio frame into N groups, and group all downlink serving cells into M groups;

a determination unit configured to determine a corresponding relation between the M groups of downlink serving cells and the N groups of uplink subframes;

a transmission unit configured to transmit, according to the determined corresponding relation, the uplink control information corresponding to a serving cell needing to be transmitted on an uplink subframe corresponding to the serving cell, wherein the mentioned M and the mentioned N are both positive integers greater than 1, and M is greater than or equal to N.

Under the condition that the determination unit is configured to determine a corresponding relation between the M groups of downlink serving cells and the N groups of uplink subframes, the corresponding relation is determined according to at least one of the following pre-configuration modes:

mode I: the corresponding relation is determined according to a preset corresponding relation;

mode II: the corresponding relation is determined according to a corresponding relation configured by a signalling;

mode III: the corresponding relation is determined according to a corresponding relation between a downlink serving cell group index and an uplink subframe group index;

mode IV: the corresponding relation is determined according to a corresponding relation between the types of the downlink serving cells and the types of the uplink subframes;

mode V: the corresponding relation is determined according to a feedback relation between a subframe on which a PDSCH of a downlink serving cell is located and an HARQ-ACK corresponding to the PDSCH.

Preferably, the grouping unit includes: a subframe grouping subunit configured to, under the condition that the uplink subframes in the radio frame are grouped into N groups, perform grouping according to at least one of the following group configuration modes:

mode I: grouping is performed according to subframe indexes;

mode II: grouping is performed according to the uplink subframes included in each group indicated by a signalling;

mode III: grouping is performed according to the quantity of the downlink serving cells and/or the types of the downlink serving cells;

mode IV: grouping is performed according to a feedback relation between a subframe where DCI corresponding to the PDSCH of a downlink serving cell is located and the HARQ-ACK corresponding to the PDSCH.

Preferably, the subframe grouping subunit is further configured to, when grouping is performed according to subframe indexes, perform grouping according to at least one of the following subframe configuration modes:

mode I: those with odd subframe indexes form one group, and those with even subframe indexes form another group;

mode II: those with the subframe indexes of the first half frame form one group, and those with the subframe indexes of the second half frame form another group;

mode III: appointed subframes form one group, and the rest subframes form another group.

Preferably, individual groups of uplink subframes are independent from each other, and the independence of each group of uplink subframes is: one group of uplink subframes corresponds to a definition advance; or channels/signals on one group of uplink subframes correspond to a set of power control parameters.

Preferably, the grouping unit comprises a cell grouping subunit configured to, when all downlink serving cells are grouped into M groups, perform grouping according to at least one of the following cell configuration modes;

mode I: grouping is performed according to a backhaul type;

mode II: grouping is performed according to the types of the serving cells;

mode III: grouping is performed on the serving cells included in each group indicated by a signalling;

mode IV: grouping is self-adaptively performed according to a transmission situation of the DCI corresponding to the PDSCH of a downlink serving cell.

Preferably, the cell grouping subunit is further configured to, when grouping is performed according to the types of the serving cells, take primary serving cells as one group, and take secondary serving cells as another group, or take serving cells corresponding to a same frequency band as one group, or when the serving cells are FDD (Frequency Division Duplex) serving cells and TDD (Time Duplex Division) serving cells, take the FDD serving cells as one group, and take the TDD serving cells as another group, or take the downlink serving cells corresponding to the uplink serving cells of a same Timing Advance Group (TAG) as one group.

Preferably, the determination unit is further configured to: when uplink control information corresponding to the downlink serving cells is transmitted on the uplink subframes according to the determined corresponding relation, select the uplink serving cells where the uplink subframes that transmit the uplink control information are located.

Preferably, the determination unit is further configured to, when it is selected the uplink serving cells where the uplink subframes that transmit the uplink control information are located, determine the uplink serving cells selected for transmission according to any one of the following cell determination modes:

mode I: determination is implemented according to a downlink serving cell where the PDSCH corresponding to the uplink control information is located or the uplink serving cells corresponding to the downlink serving cell group;

mode II: determination is implemented according to a downlink serving cell where the DCI corresponding to the PDSCH which corresponds to the uplink control information is located or the uplink serving cells corresponding to the downlink serving cell group;

mode III: the uplink serving cells are the primary serving cells.

Preferably, when there is multiple downlink serving cells in the downlink serving cell group, the uplink serving cells corresponding to the downlink serving cell group are such uplink serving cells that correspond to the primary downlink serving cells in the downlink serving cell group.

Preferably, the determination unit is further configured to, when the uplink control information corresponding to the downlink serving cells is transmitted on the uplink subframes according to the determined corresponding relation, in the case that the uplink control information to be transmitted is an HARQ-ACK, determine an HARQ-ACK to be transmitted according to an existing timing relation and the uplink subframes; or in the case that the uplink control information to be transmitted is an HARQ-ACK, determine an HARQ-ACK to be transmitted according to a new timing relation and the uplink subframes.

Preferably, the new timing relation is that the HARQ-ACK corresponding to the PDSCH on a subframe numbering n of the downlink serving cell is transmitted on an uplink subframe numbering n+k in an uplink subframe group corresponding to a downlink serving cell group where the downlink serving cell is located.

Preferably, the new timing relation is that, for a downlink serving cell of an FDD system, feedback timing is grouped according to uplink subframes in an uplink subframe group corresponding to a downlink serving cell group where the downlink serving cell is located, wherein different downlink subframes in the downlink serving cell group is regrouped according to the uplink subframes in the uplink subframe group corresponding to the downlink serving cell group.

Preferably, the transmission unit is further configured to, when there are PUSCH of other uplink subframes needing to be transmitted in the subframe group corresponding to the uplink subframe, and the downlink serving cell corresponding to the uplink serving cell where the uplink subframe is located and the downlink serving cells corresponding to the uplink serving cells where the other uplink subframes are located belong to a same downlink serving cell group, transmit the uplink control information on the PUSCH, or when there are PUSCH of other uplink subframes needing to be transmitted in the subframe group corresponding to the uplink subframe, and the downlink serving cell corresponding to the uplink serving cell where the uplink subframe is located and the downlink serving cells corresponding to the uplink serving cells where the other uplink subframes are located do not belong to a same downlink serving cell group, transmit the uplink control information on a Physical Uplink Control CHannel (PUCCH), or when there are PUSCH of other uplink subframes needing to be transmitted in the subframe group corresponding to the uplink subframe, and the downlink serving cell corresponding to the uplink serving cell where the uplink subframe is located and the downlink serving cells corresponding to the uplink serving cells where part of the other uplink subframes are located belong to a same downlink serving cell group, transmit the uplink control information on the PUSCH, or when there are PUSCH of other uplink subframes needing to be transmitted in the subframe group corresponding to the uplink subframe, it is configured through a signalling whether the uplink control information is transmitted on the PUCCH or on the PUSCH.

A device for receiving uplink control information, located at a base station side, includes:

a grouping configuration unit configured to group uplink subframes in a radio frame into N groups, and group all downlink serving cells into M groups;

a corresponding relation configuration unit configured to determine a corresponding relation between the M groups of downlink serving cells and the N groups of uplink subframes; and a receiving unit configured to receive uplink control information corresponding the downlink serving cells on the uplink subframes according to the determined corresponding relation, wherein M and N are both positive integers greater than 1, and M is greater than or equal to N, wherein when the determination unit is configured to determine a corresponding relation between the M groups of downlink serving cells and the N groups of uplink subframes, the corresponding relation is determined according to at least one of the following pre-configuration modes:

mode I: the corresponding relation is determined according to a preset corresponding relation;

mode II: the corresponding relation is determined according to a corresponding relation configured by a signalling;

mode III: the corresponding relation is determined according to a corresponding relation between a downlink serving cell group index and an uplink subframe group index;

mode IV: the corresponding relation is determined according to a corresponding relation between the types of the downlink serving cells and the types of the uplink subframes;

mode V: the corresponding relation is determined according to a feedback relation between a subframe on which a Physical Downlink Shared CHannel (PDSCH) of each downlink serving cell is located and a Hybrid Automatic Repeat reQuest Acknowledgement (HARQ-ACK) corresponding to the PDSCH.

The examples of the disclosure are further described below:

Embodiment I:

All the serving cells that support dual connectivity are FDD serving cells. It supposes that M is equal to 2 and N is equal to 2, so that the corresponding relation between 2 groups of serving cells and 2 groups of uplink subframes is preset such that the HARQ-ACK information which needs to be transmitted on the first group of serving cells is transmitted in the first group of uplink subframes, and the HARQ-ACK information to be transmitted on the second group of serving cells is transmitted in the second group of uplink subframes.

Figure 4A:
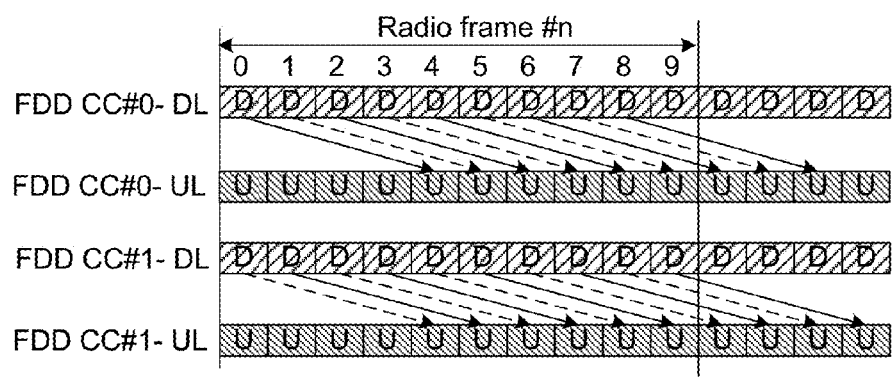
FIG. 4a-4d is a diagram of a first embodiment of the disclosure.

Specific Application Example I:

It supposes that the FDD serving cells #0 are primary serving cells, so the downlink serving cells are grouped into 2 groups according to a situation that the primary serving cells form one group and secondary serving cells form one group, wherein the FDD serving cells #0 belong to the first group of serving cells, and the FDD serving cells #1 belong to the second group of serving cells. Those with even subframe indexes are fixed to be the first group of uplink subframes, and those with odd subframe indexes are fixed to be the second group of uplink subframes. That is, the HARQ-ACK information corresponding to the serving cells #0 is transmitted on uplink subframes with the subframe indexes of {0, 2, 4, 6, 8}, and the HARQ-ACK information corresponding to the serving cells #1 is transmitted on the uplink subframes with the subframe indexes of {1, 3, 5, 7, 9}. The uplink serving cells where the transmitted HARQ-ACK is located are determined according to uplink serving cells corresponding to the downlink serving cells (the downlink serving cell group) where the PDSCH corresponding to the uplink control information is located, and the timing relation between the PDSCH and the HARQ-ACK information in the existing FDD is adopted, as shown in FIG. 4*a*.

For the serving cells #0: the HARQ-ACK to be transmitted is determined according to the existing timing relation, the uplink subframes included in the first group of uplink subframes and the uplink subframes included in the second group of uplink subframes, that is, the HARQ-ACK information corresponding to the PDSCH of the downlink subframes with the subframe indexes of {0, 2, 4} is transmitted on the uplink subframes with the subframe indexes of {4, 6, 8} of the serving cells #0 respectively; a base station does not schedule the PDSCH of the downlink subframes with the subframe indexes of {1, 3, 5}, as shown by dotted lines in the drawing.

For the serving cells #1: the HARQ-ACK to be transmitted is determined according to the existing timing relation, the uplink subframes included in the first group of uplink subframes and the uplink subframes included in the second group of uplink subframes; the HARQ-ACK information corresponding to the PDSCH of the downlink subframes with the subframe indexes of {1, 3, 5} is transmitted on the uplink subframes with the subframe indexes of {5, 7, 9} of the serving cells #1 respectively; the base station does not schedule the PDSCH of the downlink subframes with the subframe indexes of {0, 2, 4}, as shown by dotted lines in the drawing.

Figure 4B:
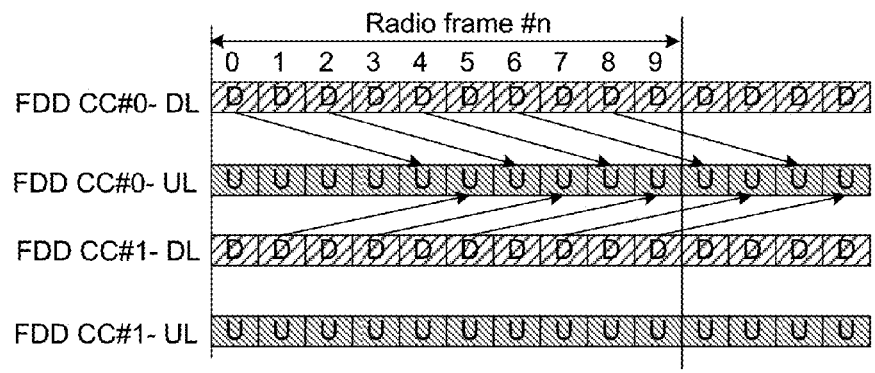

Specific Application Example II:

It supposes that the FDD serving cells #0 are primary serving cells, so the downlink serving cells are grouped into 2 groups according to the situation that the primary serving cells form one group and secondary serving cells form one group, wherein the FDD serving cells #0 belong to the first group of serving cells, and the FDD serving cells #1 belong to the second group of serving cells. Those with even subframe indexes are fixed to be the first group of uplink subframes, and those with odd subframe indexes are fixed to be the second group of uplink subframes. that is, the HARQ-ACK information corresponding to the serving cells #0 is transmitted on the uplink subframes with the subframe indexes of {0, 2, 4, 6, 8}, and the HARQ-ACK information corresponding to the serving cells #1 is transmitted on the uplink subframes with the subframe indexes of {1, 3, 5, 7, 9}. The uplink serving cells where the transmitted HARQ-ACK is located are the primary serving cells, and the existing timing relation between the PDSCH and the HARQ-ACK information in the existing FDD is adopted, as shown in FIG. 4*b*.

For the serving cells #0: the HARQ-ACK to be transmitted is determined according to the existing timing relation, the uplink subframes included in the first group of uplink subframes and the uplink subframes included in the second group of uplink subframes; the HARQ-ACK information corresponding to the PDSCH of the downlink subframes with the subframe indexes of {0, 2, 4} is transmitted on the uplink subframes with the subframe indexes of {4, 6, 8} of the serving cells #0 respectively; the base station does not schedule the PDSCH of the downlink subframes with the subframe indexes of {1, 3, 5}.

For the serving cells #1: the HARQ-ACK to be transmitted is determined according to the existing timing relation, the uplink subframes included in the first group of uplink subframes and the uplink subframes included in the second group of uplink subframes; the HARQ-ACK information corresponding to the PDSCH of the downlink subframes with the subframe indexes of {1, 3, 5} is transmitted on the uplink subframes with the subframe indexes of {5, 7, 9} of the serving cells #0 respectively; the base station does not schedule the PDSCH of the downlink subframes with the subframe indexes of {0, 2, 4}.

Specific Application Example III:

It supposes that according to the network configuration, the FDD serving cells #0 belong to the first group of serving cells, and the FDD serving cells #1 belong to the second group of serving cells. A high-level signalling configures those with the subframe indexes of {0, 2, 4, 6, 8} to be the first group of uplink subframes, and those with the subframe indexes of {1, 3, 5, 7, 9} to be the second group of uplink subframes. That is, the HARQ-ACK information corresponding to the serving cells #0 is transmitted on the uplink subframes with the subframe indexes of {0, 2, 4, 6, 8}, and the HARQ-ACK information corresponding to the serving cells #1 is transmitted on the uplink subframes with the subframe indexes of {1, 3, 5, 7, 9}. The uplink serving cells where the transmitted HARQ-ACK is located are determined according to the uplink serving cells corresponding to the downlink serving cells (the downlink serving cell group) where the PDSCH corresponding to the uplink control information is located; the timing relation between the PDSCH and the HARQ-ACK information in the existing FDD technique is adopted. The specific processing mechanism is the same as that in the specific application example I, so no repeated description will be given here.

Figure 4C:
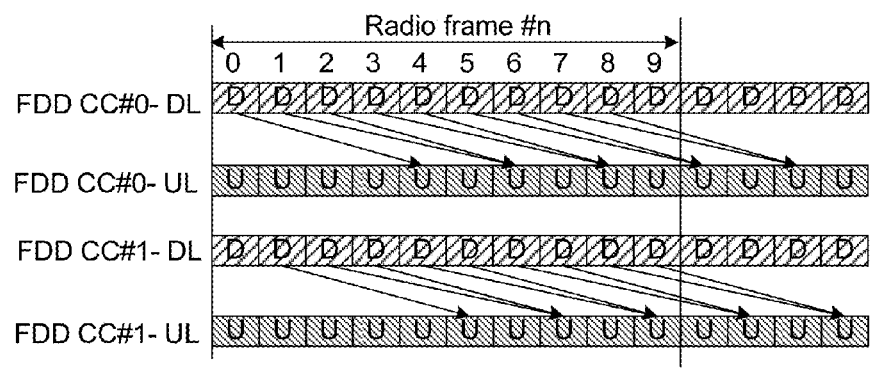

Specific Application Example IV:

It supposes that the backhaul between the FDD serving cells #0 and the FDD serving cells #1 is not ideal, so the serving cells #0 belong to the first group of serving cells, and the FDD serving cells #1 belong to the second group of serving cells. Those with the subframe indexes of {0, 2, 4, 6, 8} are fixed to be the first group of uplink subframes, and those with the subframe indexes of {1, 3, 5, 7, 9} are fixed to be the second group of uplink subframes. That is, the HARQ-ACK information corresponding to the serving cells #0 is transmitted on the uplink subframes with the subframe indexes of {0, 2, 4, 6, 8}, and the HARQ-ACK information corresponding to the serving cells #1 is transmitted on the uplink subframes with the subframe indexes of {1, 3, 5, 7, 9}. The uplink serving cells where the transmitted HARQ-ACK is located are determined according to the uplink serving cells corresponding to the downlink serving cells (the downlink serving cell group) where the PDSCH corresponding to the uplink control information is located. The HARQ-ACK to be transmitted is determined according to a new timing relation, the uplink subframes included in the first group of uplink subframes and the uplink subframes included in the second group of uplink subframes. The new timing relation is that the HARQ-ACK corresponding to the PDSCH on the subframe n is transmitted on the subframe n+k, wherein k is greater than or equal to 4, and meets that the subframe n+k belongs to the corresponding uplink subframe group and the feedback delay is minimum; in addition, the HARQ-ACK loaded on each uplink subframe is almost equivalent or equivalent, as shown in FIG. 4c.

The HARQ-ACK information corresponding to the PDSCH of the downlink subframes with the subframe indexes of {0, 2, 4} of the serving cells #0 is transmitted on the uplink subframes with the subframe indexes of {4, 6, 8} of the serving cells #0 respectively; the HARQ-ACK information corresponding to the PDSCH of the downlink subframes with the subframe indexes of {1, 3} is transmitted on the uplink subframes with the subframe indexes of {6, 8} respectively.

The HARQ-ACK information corresponding to the PDSCH of the downlink subframes with the subframe indexes of {1, 3, 5} of the serving cells #1 is transmitted on the uplink subframes with the subframe indexes of {5, 7, 9} of the serving cells #1 respectively; the HARQ-ACK information corresponding to the PDSCH of the downlink subframes with the subframe indexes of {0, 2} is transmitted on the uplink subframes with the subframe indexes of {5, 7} respectively.

Specific Application Example V:

It supposes that the FDD serving cells #0 belong to the first group of serving cells, and the FDD serving cells #1 belong to the second group of serving cells. A high-level signalling configures those with the subframe indexes of {4, 8} to be the first group of uplink subframes and those with the subframe indexes of {5, 9} to be the second groups of uplink subframes. That is, the HARQ-ACK information corresponding to the serving cells #0 is transmitted on the uplink subframes with the subframe indexes of {4, 8}, and the HARQ-ACK information corresponding to the serving cells #1 is transmitted on the uplink subframes with the subframe indexes of {5, 9}. The uplink serving cells where the transmitted HARQ-ACK is located are determined according to the uplink serving cells corresponding to the downlink serving cells (the downlink serving cell group) where the PDSCH corresponding to the uplink control information is located. The HARQ-ACK to be transmitted is determined according to a new timing relation, the uplink subframes included in the first group of uplink subframes and the uplink subframes included in the second group of uplink subframes. The new timing relation is that the HARQ-ACK corresponding to the PDSCH on the subframe n is transmitted on the subframe n+k, wherein k is greater than or equal to 4, and meets that the subframe n+k belongs to the corresponding uplink subframe group and the feedback delay is minimum; in addition, the HARQ-ACK loaded on each uplink subframe is almost equivalent or equivalent.

Figure 4D:
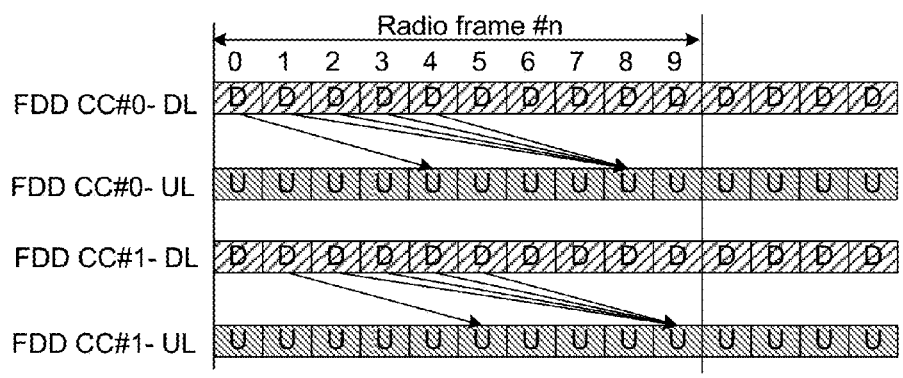

As shown in FIG. 4d, the HARQ-ACK information corresponding to the PDSCH of the downlink subframe with the subframe index of {0} of the serving cells #0 is transmitted on the uplink subframe with the subframe index of {4}; the HARQ-ACK information corresponding to the PDSCH of the downlink subframes with the subframe indexes of {1, 2, 3, 4} is transmitted on the uplink subframe with the subframe index of {8}.

The HARQ-ACK information corresponding to the PDSCH of the downlink subframe with the subframe index of {1} of the serving cells #1 is transmitted on the uplink subframe with the subframe index of {5}; the HARQ-ACK information corresponding to the PDSCH of the downlink subframes with the subframe indexes of {2, 3, 4, 5} is transmitted on the uplink subframe with the subframe index of {9} respectively.

Specific Application Example VI:

It supposes that the FDD serving cells #0 belong to the first group of serving cells, and the FDD serving cells #1 belong to the second group of serving cells. A high-level signalling configures those with the subframe indexes of {0, 2, 4, 6, 8} to be the first group of uplink subframes and those with the subframe indexes of {1, 3, 5, 7, 9} to be the second groups of uplink subframes. That is, the HARQ-ACK information corresponding to the serving cells #0 is transmitted on the uplink subframes with the subframe indexes of {0, 2, 4, 6, 8}, and the HARQ-ACK information corresponding to the serving cells #1 is transmitted on the uplink subframes with the subframe indexes of {1, 3, 5, 7, 9}. The uplink serving cells where the transmitted HARQ-ACK is located are determined according to the uplink serving cells corresponding to the downlink serving cells (the downlink serving cell group) where the PDSCH corresponding to the uplink control information is located. The HARQ-ACK to be transmitted is determined according to a new timing relation, the uplink subframes included in the first group of uplink subframes and the uplink subframes included in the second group of uplink subframes. The new timing relation is that feedback timing is grouped (classified) according to the available uplink subframes corresponding to the uplink subframe group corresponding to the serving cell group where the downlink serving cells are located, and regrouping is performed on different downlink subframes in the downlink serving cell groups according to the uplink subframes in the uplink subframe groups corresponding to the downlink serving cell groups.

As shown in FIG. 4d, the serving cells #0 belong to the first group of serving cells, and the first group of serving cells corresponds to the first group of uplink subframes. The subframe indexes of the available uplink subframes in the first group of uplink subframes are {0, 2, 4, 6, 8}. Then, the downlink subframes in the serving cells #0 are regrouped, wherein the downlink subframes with the subframe indexes of {1, 2} form a feedback window, and the HARQ-ACK corresponding to the PDSCH in the feedback window is transmitted on the uplink subframes with the subframe indexes of {6} of the serving cells #0. The downlink subframes with the subframe indexes of {3, 4} form a feedback window, and the HARQ-ACK corresponding to the PDSCH in the feedback window is transmitted on the uplink subframes with the subframe indexes of {8} of the serving cells #0. The processing mode for the serving cells #1 is the same as that of the serving cells #0, so no repeated description will be given here.

Embodiment II:

All the serving cells that support dual connectivity are FDD serving cells. It supposes that M and N are both equal to 2. The corresponding relation between 2 groups of serving cells and 2 groups of uplink subframes is instructed by a signalling, that is, the HARQ-ACK information to be transmitted on the first group of serving cells is transmitted in the first group of uplink subframes, and the HARQ-ACK information to be transmitted on the second group of serving cells is transmitted in the second group of uplink subframes. The specific implementation manner is the same as that of the embodiment I, so no repeated description will be given here.

Embodiment III:

All the serving cells that support dual connectivity are FDD serving cells. It supposes that M is equal to 2 and N is equal to 2. The corresponding relation between 2 groups of serving cells and 2 groups of uplink subframes meets: according to the corresponding relation between the indexes of the downlink serving cell groups and the indexes of the uplink subframe groups, if the index of the downlink serving cell group is #0, the index of the corresponding uplink subframe is #0; if the index of the downlink serving cell group is #1, the index of the corresponding uplink subframe group is #1, wherein the primary serving cells form one group, and other serving cells form one group. The specific implementation manner is the same as that of the embodiment I, so no repeated description will be given here.

Embodiment IV:

All the serving cells that support dual connectivity are FDD serving cells. it supposes that M is equal to 4 and N is equal to 2. The corresponding relation between 4 groups of serving cells and 2 groups of uplink subframes meets: according to the corresponding relation between the indexes of the downlink serving cell groups and the indexes of the uplink subframe groups, the index of the downlink serving cell group #0 and the index of the downlink serving cell group #1 correspond to the index of the uplink subframe #0; the index of the downlink serving cell group #2 and the index of the downlink serving cell group #3 correspond to the index of the uplink subframe group #1, wherein the downlink serving cell grouping mode is configured by a signalling. The specific implementation manner is the same as that of the embodiment I, so no repeated description will be given here.

Embodiment V:

All the serving cells that support dual connectivity are the FDD serving cells, and there are 4 downlink serving cells; M is equal to 2, and N is equal to 2. The corresponding relation between 2 groups of serving cells and 2 groups of uplink subframes meets: corresponding relation between the downlink serving cell groups and the uplink subframe groups is configured by a signalling, that is, the first group of serving cells corresponds to the first group of uplink subframes, and the second group of serving cells corresponds to the second group of uplink subframes. A downlink serving cell grouping mode is configured by a signalling, that is, the downlinking serving cells #0 and the downlink serving cells #1 belong to the first group of serving cells, and the downlink serving cells #2 and the downlink serving cells #3 belong to the second group of serving cells, in which the downlink serving cells #0 are the primary serving cells in the first group of serving cells, and the downlink serving cells #3 are the primary serving cells in the second group of serving cells. Then, the uplink control information to be transmitted in the first group of serving cells is transmitted on the first group of uplink subframes in the uplink serving cells corresponding to the downlink serving cells #0, and the uplink control information to be transmitted in the second group of serving cells is transmitted on the second group of uplink subframes in the uplink serving cells corresponding to the downlink serving cells #1.

Embodiment VI:

All the serving cells that support dual connectivity are the FDD serving cells, only the downlink subframes with the subframe indexes of {1, 2} in the serving cells #0 have the DCI corresponding to the PDSCH, and only the downlink subframe with the subframe index {5} in the serving cells #1 has the corresponding DCI. It supposes that M is equal to 2 and N is equal to 2, the uplink subframes are then grouped into 2 groups according to the feedback relation between the subframes where the DCI corresponding to the PDSCH of the downlink serving cells is located and the HARQ-ACK corresponding to the PDSCH, those with the subframe indexes of {5, 6} being one group and those with the subframe indexes of {9} being one group. Adaptive grouping is performed according to the transmission situation of the DCI corresponding to the PDSCH of the downlink serving cells, that is, the serving cells #0 and the serving cells #1 form one group, and the uplink serving cells corresponding to this serving cell group are serving cells #0; the serving cells #2 form one group. The corresponding relation between the 2 groups of serving cells and the 2 groups of uplink subframes is that: the relation is determined according to the feedback relation between the subframes where the PDSCH of the downlink serving cells is located and the HARQ-ACK corresponding to the PDSCH; the uplink serving cells where the transmitted HARQ-ACK is located are determined according to the uplink serving cells corresponding to the downlink serving cells (the downlink serving cell group) where the PDSCH corresponding to the uplink control information is located.

Figure 4E:
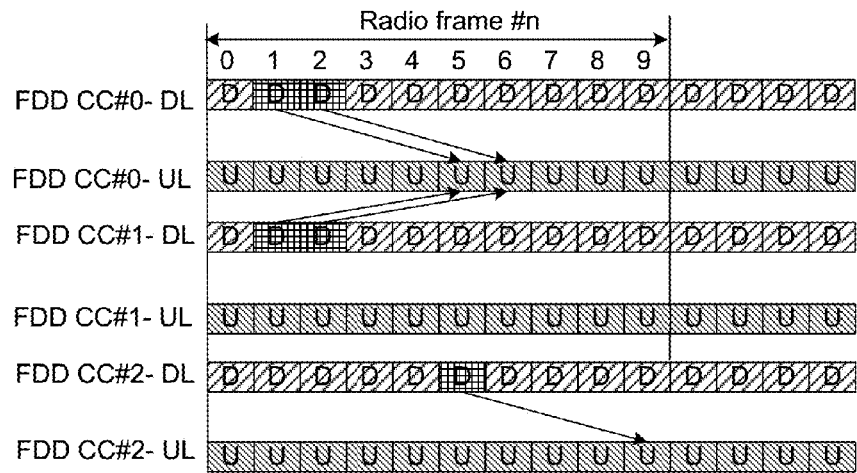
FIG. 4e is a diagram of the embodiment VI of the disclosure.

As shown in FIG. 4e, the HARQ-ACK corresponding to the PDSCH with the subframe indexes of {1, 2} in the serving cells #0 is transmitted on the uplink subframes with the subframe indexes of {5, 6} in the serving cells #0 respectively. The HARQ-ACK corresponding to the PDSCH with the subframe indexes of {1, 2} in the serving cells #1 is transmitted on the uplink subframes with the subframe indexes of {5, 6} in the serving cells #0 respectively. The HARQ-ACK corresponding to the PDSCH of the subframe indexes of {5} in the serving cells #1 is transmitted on the uplink subframes with the subframe indexes of {9} in the serving cells #1.

In addition, the limitation to the subframe indexes where the DCI corresponding to the PDSCH is located can be also adaptive, and the base station independently performs scheduling and selection, thus ensuring that the PDSCH transmission of a plurality of downlink serving cell groups is not simultaneously scheduled in one downlink subframe.

Embodiment VII:

All the serving cells that support dual connectivity are the TDD serving cells. It supposes that M and N are both equal to 2. The corresponding relation between 2 groups of serving cells and 2 groups of uplink subframes is preset, that is, the HARQ-ACK information to be transmitted on the first group of serving cells is transmitted in the first group of uplink subframes, and the HARQ-ACK information to be transmitted on the second group of serving cells is transmitted in the second group of uplink subframes.

The N subframe groups may be different under different uplink to downlink configurations.

The specific example below supposes that the uplink to downlink configuration of the TDD serving cells is configuration #1.

Figure 5A:
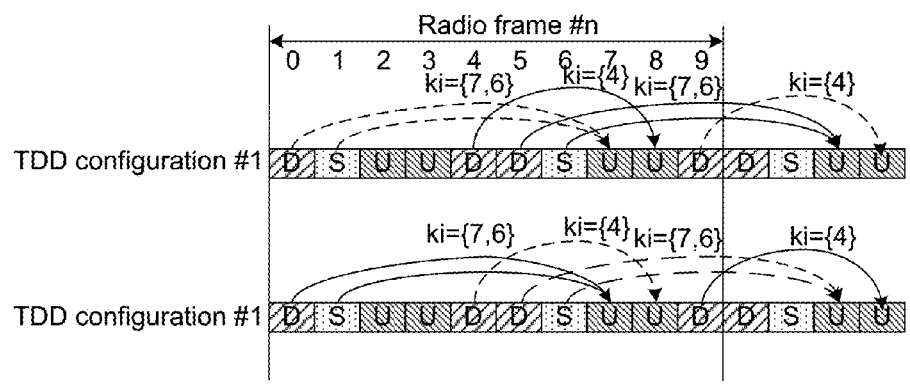
FIG. 5a-5c is a diagram of the embodiment VII of the disclosure.

Specific Application Example 1:

It supposes the TDD serving cells #0 are the primary serving cells. According to the situation that the primary serving cells form one group and the secondary serving cells form one group, the TDD serving cells #0 belong to the first group of serving cells, and the TDD serving cells #1 belong to the second group of serving cells. The uplink subframes are grouped into 2 groups according to odd and even numbers; those with the subframe indexes of {2, 8} are fixed to be the first group of uplink subframes, and those with the subframe indexes of {3, 7} are fixed to be the second group of uplink subframes. That is, the HARQ-ACK information corresponding to the serving cells #0 is transmitted on uplink subframes with the subframe indexes of {2, 8}, and the HARQ-ACK information corresponding to the serving cells #1 is transmitted on uplink subframes with the subframe indexes of {3, 7}. The uplink serving cells where the transmitted HARQ-ACK is located are determined according to the uplink serving cells corresponding to the downlink serving cells (the downlink serving cell group) where the PDSCH corresponding to the uplink control information is located, as shown in FIG. 5a.

For the serving cells #0, the HARQ-ACK information corresponding to the PDSCH of the downlink subframes with the subframe indexes of {4} of the radio frame #n is transmitted on the uplink subframes with the subframe indexes of {8} of the serving cells #0 in the radio frame #n. The HARQ-ACK information corresponding to the PDSCH of the downlink subframes with the subframe indexes of {5, 6} of the serving cells #0 in the radio frame #n is transmitted on the uplink subframes with the subframe indexes of {2} in the radio frame #n+1. A base station does not schedule the PDSCH of the downlink subframes with the subframe indexes of {0, 1, 9}, as shown by dotted lines in the drawing.

For the serving cells #1, the HARQ-ACK information corresponding to the PDSCH of the downlink subframes with the subframe indexes of {0, 1} of the radio frame #n is transmitted on the uplink subframes with the subframe indexes of {7} of the serving cells #1 in the radio frame #n. The HARQ-ACK information corresponding to the PDSCH of the downlink subframes with the subframe indexes of {9} of the serving cells #1 in the radio frame #n is transmitted on the uplink subframes with the subframe indexes of {3} in the radio frame #n+1. A base station does not schedule the PDSCH of the downlink subframes with the subframe indexes of {4, 5, 6}, as shown by dotted lines in the drawing.

Specific Application Example 2:

According to the signalling configuration, the TDD serving cells #0 belong to the first group of serving cells, and the TDD serving cells #1 belong to the second group of serving cells. A signalling configures that those with the subframe indexes of {2, 8} are fixed to be the first group of uplink subframes, and those with the subframe indexes of {3, 7} are fixed to be the second group of uplink subframes. That is, the HARQ-ACK corresponding to the serving cells #0 is transmitted on the uplink subframes with the subframe indexes of {2, 8}, and the HARQ-ACK corresponding to the serving cells #1 is transmitted on the uplink subframes with the subframe indexes of {3, 7}. The uplink serving cells where the transmitted HARQ-ACK is located are determined according to the uplink serving cells corresponding to the downlink serving cells (the downlink serving cell group) where the PDSCH corresponding to the uplink control information is located. The specific processing mechanism is the same as that of the specific application example 1, so no repeated description is given here.

Figure 5B:
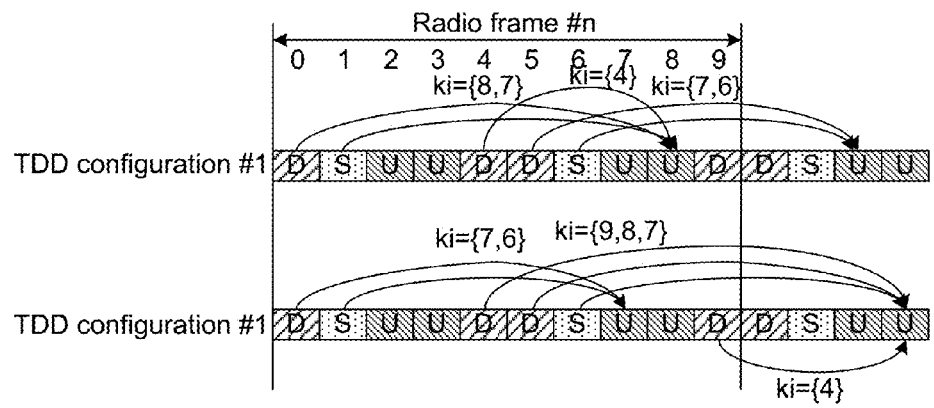

Specific Application Example 3:

The backhaul between the TDD serving cells #0 and the TDD serving cells #0 is not ideal, the TDD serving cells #0 belong to the first group of serving cells, and the TDD serving cells #1 belong to the second group of serving cells. Those with the subframe indexes of {2, 8} are fixed to be the first group of uplink subframes, and those with the subframe indexes of {3, 7} are fixed to be the second group of uplink subframes. That is, the HARQ-ACK information corresponding to the serving cells #0 is transmitted on uplink subframes with the subframe indexes of {2, 8}, and the HARQ-ACK information corresponding to the serving cells #1 is transmitted on uplink subframes with the subframe indexes of {3, 7}. The uplink serving cells where the transmitted HARQ-ACK is located are determined according to the uplink serving cells corresponding to the downlink serving cells (the downlink serving cell group) where the PDSCH corresponding to the uplink control information is located, as shown in FIG. 5b.

For the serving cells #0, the HARQ-ACK information corresponding to the PDSCH of the downlink subframes with the subframe indexes of {0, 1, 4} of the radio frame #n is transmitted on the uplink subframes with the subframe indexes of {8} of the serving cells #0 in the radio frame #n. The HARQ-ACK information corresponding to the PDSCH of the downlink subframes with the subframe indexes of {5, 6} in the radio frame #n is transmitted on the uplink subframes with the subframe indexes of {2} in the radio frame #n+1.

For the serving cells #1, the HARQ-ACK information corresponding to the PDSCH of the downlink subframes with the subframe indexes of {0, 1} of the radio frame #n is transmitted on the uplink subframes with the subframe indexes of {7} of the serving cells #1 in the radio frame #n. The HARQ-ACK information corresponding to the PDSCH of the downlink subframes with the subframe indexes of {4, 5, 6, 9} of the radio frame #n is transmitted on the uplink subframes with the subframe indexes of {3} of the serving cells #1 in the radio frame #n+1.

Specific Application Example 4:

According to the signalling configuration, the TDD serving cells #0 belong to the first group of serving cells, and the TDD serving cells #1 belong to the second group of serving cells. A signalling configures that uplink subframe with the subframe indexes of {2, 8} are fixed to be the first group of uplink subframes, and plink subframe with the subframe indexes of {3, 7} are fixed to be the second group of uplink subframes. That is, the HARQ-ACK corresponding to the serving cells #0 is transmitted on the uplink subframes with the subframe indexes of {2, 8}, and the HARQ-ACK corresponding to the serving cells #1 is transmitted on the uplink subframes with the subframe indexes of {3, 7}. The uplink serving cells where the transmitted HARQ-ACK is located are determined according to the uplink serving cells corresponding to the downlink serving cells (the downlink serving cell group) where the PDSCH corresponding to the uplink control information is located. The specific processing mechanism is the same as that of the specific application example 3, so no repeated description is given here.

The specific example below supposes that the uplink and downlink configurations of the TDD serving cells are configuration #1 and configuration #2.

Figure 5C:
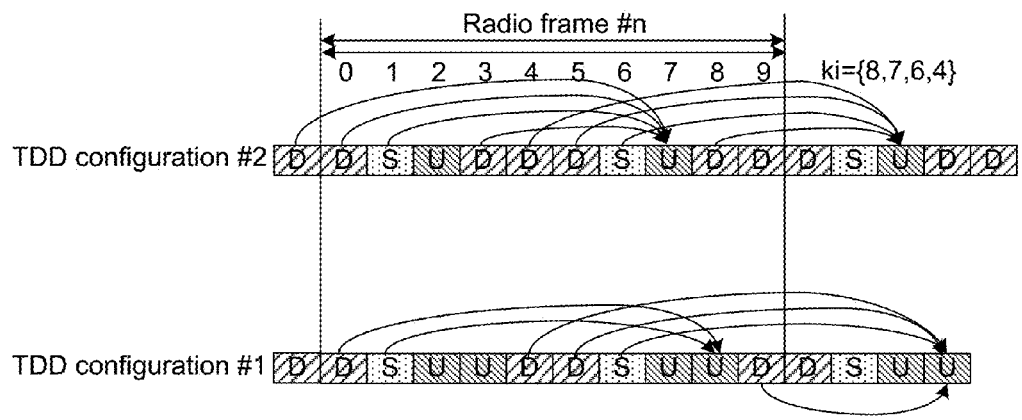

The Specific Application Example 5:

The first group of serving cells is the serving cells #0 under the TDD configuration #2, and the second group of serving cells is the serving cells #1 under the TDD configuration #1. For the configuration #2, those with the subframe indexes of {2, 7} are the uplink subframes; for the configuration #1, those with the subframe indexes of {2, 3, 7, 8} are the uplink subframes. According to the uplink to downlink ratio, 2 subframe groups are determined. That is, those with the subframe indexes of {2, 7} form the first group of uplink subframes, and those with the subframe indexes of {3, 8} form the first group of uplink subframes. The first group of serving cells corresponds to the first group of uplink subframes, and the second group of serving cells corresponds to the second group of second group uplink subframes. The uplink serving cells where the transmitted HARQ-ACK is placed are determined according to the uplink serving cells corresponding to the downlink serving cells (downlink serving cell group) where the PDSCH corresponding to the uplink control information is placed, as shown in FIG. 5c.

Embodiment VIII:

The serving cells that support dual connectivity are FDD serving cells and TDD serving cells. M is equal to 2, and N is equal to 2. The corresponding relation between the serving cells and the uplink subframes is predefined, that is, the first group of serving cells corresponds to the first group of uplink subframes, and the second group of serving cells corresponds to the second group of uplink subframes.

Figure 6A:
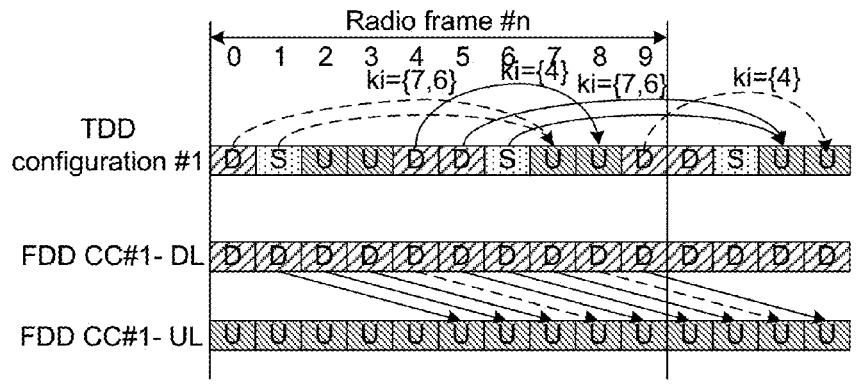
FIG. 6a-6d is a diagram of the embodiment VIII of the disclosure.

Specific Embodiment I:

It supposes that the FDD serving cells #0 are primary serving cells. The downlink serving cells are grouped into 2 groups according to a situation that the primary serving cells form one group, and the secondary serving cells form one group, wherein the TDD serving cells #0 belong to the first group of serving cells, and the FDD serving cells #0 belong to the second group of serving cells. Those with even subframe indexes are fixed to be the first group of uplink subframes, and those with odd subframe indexes are fixed to be the second group of uplink subframes. That is, the HARQ-ACK information corresponding to the TDD serving cells #0 is transmitted on the uplink subframes with the subframe indexes of {0, 2, 4, 6, 8}, and the HARQ-ACK information corresponding to the FDD serving cells #1 is transmitted on the uplink subframes with the subframe indexes of {1, 3, 5, 7, 9}. By the adoption of the timing relation between the PDSCH and the HAR-ACK information in the existing FDD or TDD, the uplink serving cells where the transmitted HARQ-ACK is located are determined according to the uplink serving cells corresponding to the downlink serving cells (downlink serving cell group) where the PDSCH corresponding to the uplink control information is located, as shown in FIG. 6a.

For the TDD serving cells #0, the HARQ-ACK information corresponding to the PDSCH of the downlink subframe with the subframe index of {4} of the radio frame #n is transmitted on the uplink subframe with the subframe index of {8} of the serving cells #0 in the radio frame #n. The HARQ-ACK information corresponding to the PDSCH of the downlink subframes with the subframe indexes of {5, 6} in the radio frame #n is transmitted on the uplink subframe with the subframe index of {2} of the serving cells #0 in the radio frame #n+1. The base station does not schedule the PDSCH of the downlink subframes with the subframe indexes of {0, 1, 9}, as shown in the dotted lines in the drawing.

For the FDD serving cells #1: the HARQ-ACK information corresponding to the PDSCH of the downlink subframes with the subframe indexes of {1, 3, 5} is transmitted on the uplink subframes with the subframe indexes of {5, 7, 9} of the serving cells #1. The base station does not schedule the PDSCH of the downlink subframe with the subframe index of {4}, as shown in the dotted lines in the drawing.

Specific Embodiment II:

It supposes that according to the network configuration, TDD serving cells #0 belong to the first group of serving cells, and the FDD serving cells #0 belong to the second group of serving cells. According to high-level signalling configuration, those with the subframe indexes of {0, 2, 4, 6, 8} form the first group of uplink subframes, and those with the subframe indexes of {1, 3, 5, 7, 9} form the second group of uplink subframes. That is, the HARQ-ACK information corresponding to the serving cells #0 is transmitted on the uplink subframes with the subframe indexes of {0, 2, 4, 6, 8}, and the HARQ-ACK information corresponding to the serving cells #1 is transmitted on the uplink subframes with the subframe indexes of {1, 3, 5, 7, 9}. By the adoption of the timing relation between the PDSCH and the HAR-ACK information in the existing FDD or TDD, the uplink serving cells where the transmitted HARQ-ACK is located are determined according to the uplink serving cells corresponding to the downlink serving cells (downlink serving cell group) where the PDSCH corresponding to the uplink control information is located. The specific processing mechanism is the same as that in the specific embodiment I, so no repeated description is given here.

Figure 6B:
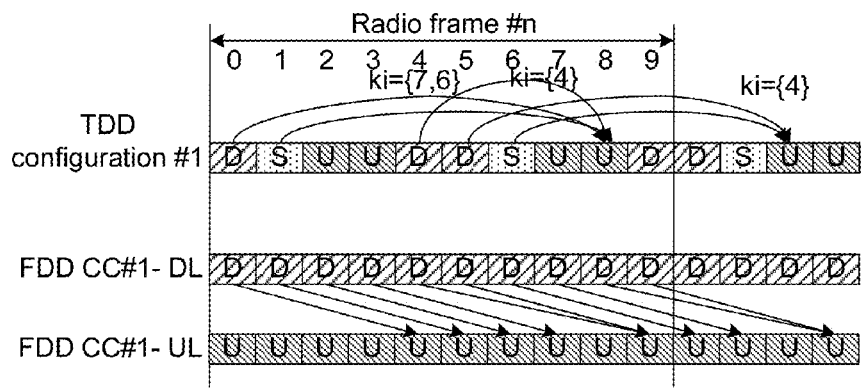

Specific Embodiment III:

It supposes that the backhaul between the FDD serving cells #0 and the TDD serving cells #0 is not ideal. The TDD serving cells #0 belong to the first group of serving cells, and the FDD serving cells #0 belong to the second group of serving cells. Those with the subframe indexes of {0, 2, 4, 6, 8} are fixed to be the first group of uplink subframes, and those with the subframe indexes of {1, 3, 5, 7, 9} are fixed to be the second group of uplink subframes. That is, the HARQ-ACK information corresponding to the TDD serving cells #0 is transmitted on the uplink subframes with the subframe indexes of {0, 2, 4, 6, 8}, and the HARQ-ACK information corresponding to the FDD serving cells #1 is transmitted on the uplink subframes with the subframe indexes of {1, 3, 5, 7, 9}. The timing relation between the PDSCH and the HARQ-ACK information in the existing FDD/TDD is changed, so a new timing relation is that the HARQ-ACK corresponding to the PDSCH on the subframe n is transmitted on the subframe n+k, wherein k is greater than or equal to 4, and meets that the subframe n+k belongs to the corresponding uplink subframe group and the feedback delay is minimum; in addition, the HARQ-ACK loaded on each uplink subframe is almost equivalent or equivalent. The uplink serving cells where the transmitted HARQ-ACK is located are determined according to the uplink serving cells corresponding to the downlink serving cells (the downlink serving cell group) where the PDSCH corresponding to the uplink control information is located, as shown in FIG. 6b.

For the TDD serving cells #0, the HARQ-ACK information corresponding to the PDSCH of the downlink subframes with the subframe indexes of {0, 1, 4} of the radio frame #n is transmitted on the uplink subframe with the subframe index of {8} of the TDD serving cell #0 in the radio frame #n. The HARQ-ACK information corresponding to the PDSCH of the downlink subframes with the subframe indexes of {5, 6} in the radio frame #n is transmitted on the uplink subframe with the subframe index of {2} of the TDD serving cell #1 in the radio frame #n+1.

For the FDD serving cells #0, the HARQ-ACK information corresponding to the PDSCH of the downlink subframes with the subframe indexes of {0, 1, 2, 3, 5} is transmitted on the uplink subframes with the subframe indexes of {4, 5, 6, 7, 9} of the FDD serving cell #0. The HARQ-ACK information corresponding to the PDSCH of the downlink subframe with the subframe index of {4} is transmitted on the uplink subframe with the subframe index {9} of the FDD serving cell #0.

Specific Embodiment IV:

It supposes that the backhaul between the FDD serving cell #0 and the TDD serving cell #0 is not ideal, the TDD serving cell #0 belongs to the first group of serving cells, and the FDD serving cell #0 belongs to the second group of serving cells. According to the types of the serving cells, those with the subframe indexes of {2, 3, 4, 7, 8, 9} form the first group of uplink subframes, and those with the subframe indexes of {0, 1, 5, 6} form the second group of uplink subframes. That is, the HARQ-ACK information corresponding to the TDD serving cells #0 is transmitted on the uplink subframes with the subframe indexes of {2, 3, 4, 7, 8, 9}, and the HARQ-ACK information corresponding to the FDD serving cells #1 is transmitted on the uplink subframes with the subframe indexes of {0, 1, 5, 6}. The uplink serving cells where the transmitted HARQ-ACK is located are determined according to the uplink serving cells corresponding to the downlink serving cells (the downlink serving cell group) where the PDSCH corresponding to the uplink control information is located.

Figure 6C:
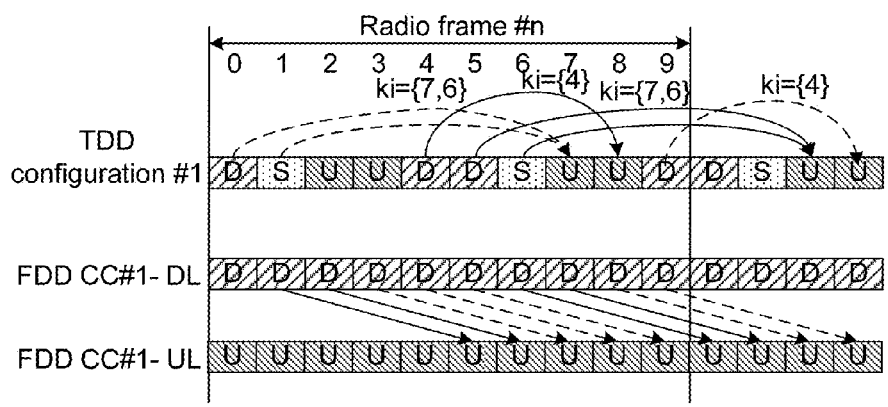
Figure 6D:
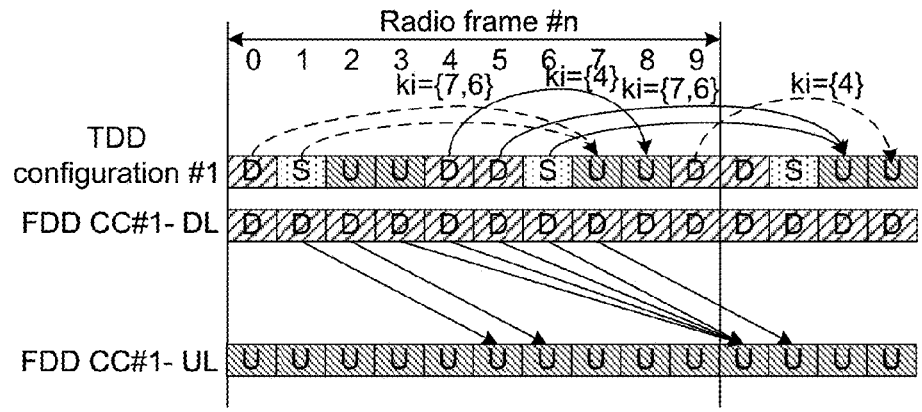

According to the existing TDD timing relation, the situation that the HARQ-ACK is transmitted on those with the subframe indexes of {0, 1, 5, 6} will not happen, so the TDD timing relation does not need to be changed. For the FDD serving cells, the HARQ-ACK needs to be transmitted on those with the subframe indexes of {0, 1, 5, 6}, then, (1) it is not scheduled such PDSCH that corresponds to HARQ-ACK which is not transmitted on those with the subframe indexes of {0, 1, 5, 6}, as shown in FIG. 6c, (2) the FDD timing relation is modified, and the new timing relation meets that the HARQ-ACK corresponding to the PDSCH on the subframe n is transmitted on the subframe n+k, wherein k is greater than or equal to 4, and meets that the subframe numbering n+k belongs to the corresponding uplink subframe group and the feedback delay is minimum; or feedback timing is grouped according to the available uplink subframes corresponding to the uplink subframe group corresponding to the serving cell group where the downlink serving cells are located, and one uplink subframe feeds back the HARQ-ACK of the multiple downlink subframes of one or more downlink serving cells, as shown in FIG. 6d.

Embodiment IX:

It supposes that the downlink serving cell #0, the downlink serving cell #1 and the downlink serving cell #2 form one group, while the downlink serving cell #3 and the downlink serving cell #4 form one group. The uplink subframe #n is one uplink subframe in the first group of uplink subframes; the first group of serving cells corresponds to the first group of uplink subframes. According to the method provided by the disclosure, it can be determined that the uplink control information can be transmitted in the uplink serving cells #0.

Figure 7A:
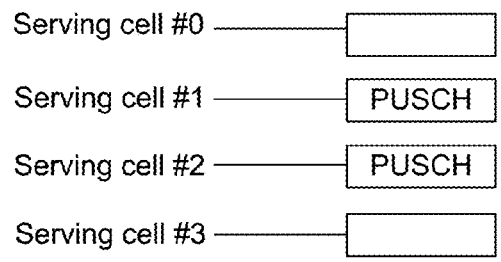
FIG. 7a-7c is a diagram of the embodiment VIII of the disclosure.

Specific Embodiment I:

As shown in FIG. 7a, when there are PUSCHs of other uplink subframes needing to be transmitted in the subframe group corresponding to the uplink subframe #n, and the downlink serving cells corresponding to the uplink serving cells where the uplink subframe is located and the downlink serving cells corresponding to the uplink serving cells where the other uplink subframes are located both belong to the same downlink serving cell group, the terminal selects one PUSCH from the PUSCHs corresponding to the serving cells #1 and the serving cells #2 to transmit the uplink control information, and the selection can be performed according to the methods below:

Method I: the uplink control information is transmitted on the PUSCH with a greater modulation coding index; if the modulation coding index corresponding to the PUSCH on the serving cell #1 is less than the modulation coding index corresponding to the PUSCH on the serving cell #2, the uplink control information is transmitted on the PUSCH on the serving cell #2.

Method II: the uplink control information is transmitted on the PUSCH with a smaller cell index, and thus is transmitted on the PUSCH on the serving cell #1.

Figure 7B:
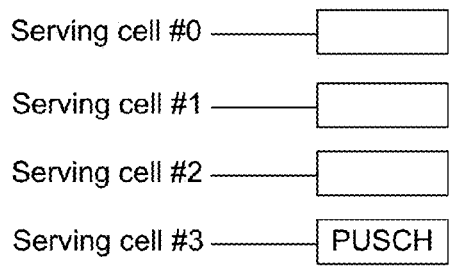

Specific Embodiment II:

As shown in FIG. 7b, when there are PUSCHs of other uplink subframes needing to be transmitted in the subframe group corresponding to the uplink subframe, and the downlink serving cells corresponding to the uplink serving cells where the uplink subframe is located and the downlink serving cells corresponding to the uplink serving cells where the other uplink subframes are located do not belong to the same downlink serving cell group, the uplink control information is transmitted on the PUSCH corresponding to the uplink serving cell #0.

Figure 7C:
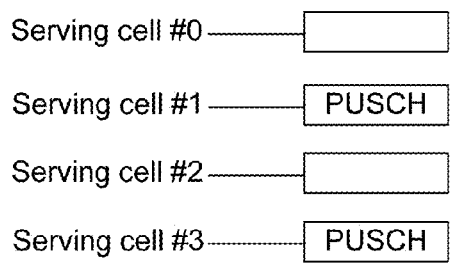

Specific Embodiment III:

As shown in FIG. 7c, when there are PUSCHs of other uplink subframes needing to be transmitted in the subframe group corresponding to the uplink subframe, and the downlink serving cells corresponding to the uplink serving cells where the uplink subframe is located and the downlink serving cells corresponding to the uplink serving cells where part of the other uplink subframes are located belong to the same downlink serving cell group, the uplink control information is transmitted on the PUSCH corresponding to the serving cells #1.

Specific Embodiment IV:

When there are PUSCHs of other uplink subframes needing to be transmitted in the subframe group corresponding to the uplink subframe, a signalling configures whether the uplink control information is transmitted on the PUCCH or on the PUSCH. When the uplink control information is transmitted on the PUSCH according to the configuration, and there are many PUSCHs, the selection method provided in the specific embodiment can be adopted to select one PUSCH to transmit the uplink control information.

When implemented in the form of software functional modules and sold or used as independent products, the integrated modules of the embodiments of the disclosure may be stored in a computer readable storage medium. On the basis of such an understanding, the essential part or the part of the technical solution of the embodiment of the disclosure which makes a contribution to the traditional art can be embodied in the form of software products. The computer software product is stored in a storage medium, which includes a plurality of instructions configured to enable a computer device (which may be a personal computer, a server, network equipment and the like) to execute all or part of the methods of the respective embodiments. The storage medium includes: various mediums, such as a USB flash disk, a mobile hard disk, a Read-Only Memory (ROM), a Random Access Memory (RAM), a magnetic disc and an optical disc, which can store program codes. Therefore, the embodiments of the disclosure are not limited to any specific hardware and software combinations.

Correspondingly, the embodiment of the disclosure further provides a computer storage medium which stores computer programs configured to execute the method for transmitting uplink control information according to the embodiments of the disclosure.

The above is only preferred embodiments of the disclosure, and not intended to limit the scope of protection of the disclosure.

INDUSTRIAL APPLICABILITY

The embodiment of the disclosure groups uplink subframes in the radio frame into N groups, groups all downlink serving cells into M groups, determines the corresponding relation between the M groups of downlink serving cells and the N groups of uplink subframes, transmits according to the determined corresponding relation the uplink control information to be transmitted on the uplink subframes which corresponds to the downlink serving cells; M and N are both positive integers greater than 1, and M is greater than or equal to N. By the adoption of the embodiment of the disclosure, the corresponding relation between the M groups of downlink serving cells and the N groups of uplink subframes is determined, and the uplink control information is transmitted according to the determined corresponding relation, so that the problem in the situation that the uplink control information is transmitted under the condition that the backhaul among the multiple serving cells is in a non-ideal state can be solved at least.

What is claimed is:

1. A method for transmitting uplink control information, comprising:
    grouping uplink subframes in a radio frame into N groups, and grouping all downlink serving cells into M groups;
    determining a corresponding relation between the M groups of downlink serving cells and the N groups of uplink subframes; and
    transmitting, by a terminal, uplink control information corresponding to the downlink serving cells, on the uplink subframes according to the determined corresponding relation, wherein M and N are both positive integers greater than 1, and M is greater than or equal to N,
    wherein determining the corresponding relation between the M groups of downlink serving cells and the N groups of uplink subframes comprises: determining the corresponding relation according to at least one of the following pre-configuration modes:
        mode I: determining the corresponding relation according to a preset corresponding relation;
        mode II: determining the corresponding relation according to a corresponding relation configured by a signalling;
        mode III: determining the corresponding relation according to a corresponding relation between a downlink serving cell group index and an uplink subframe group index;
        mode IV: determining the corresponding relation according to a corresponding relation between the types of the downlink serving cells and the types of the uplink subframes;
        mode V: determining the corresponding relation according to a feedback relation between a subframe on which a Physical Downlink Shared CHannel (PDSCH) of a downlink serving cell is located and a Hybrid Automatic Repeat reQuest Acknowledgement (HARQ-ACK) corresponding to the PDSCH; and
    wherein grouping all downlink serving cells into M groups comprises: performing grouping according to at least one of the following cell configuration modes;
        mode I: grouping according to a backhaul type;
        mode II: grouping according to the types of the serving cells; or
        mode III: self-adaptively grouping according to a transmission situation of the DCI corresponding to the PDSCH of a downlink serving cell.

2. The method according to claim 1, wherein grouping the uplink subframes in a radio frame into N groups comprises: performing grouping according to at least one of the following group configuration modes:
    mode I: grouping according to subframe indexes;
    mode II: grouping according to the uplink subframes included in each group indicated by a signalling;
    mode III: grouping according to the quantity of the downlink serving cells and/or the types of the downlink serving cells;
    mode IV: grouping according to a feedback relation between a subframe where Downlink Control Information (DCI) corresponding to the PDSCH of a downlink serving cell is located and the HARQ-ACK corresponding to the PDSCH.

3. The method according to claim 2, wherein the grouping according to subframe indexes comprises: performing grouping according to at least one of the following subframe configuration modes:
    mode I: taking those with odd subframe indexes into one group, and taking those with even subframe indexes into another group;
    mode II: taking those with the subframe indexes of the first half frame into one group, and taking those with the subframe indexes of the second half frame into another group;
    mode III: taking appointed subframes into one group, and taking the rest subframes into another group.

4. The method according to claim 1, wherein grouping according to the types of the serving cells comprises:
    taking primary serving cells into one group, and taking secondary serving cells into another group, or
    taking serving cells corresponding to a same frequency band into one group, or
    when the serving cells are Frequency Division Duplex (FDD) serving cells and Time Division Duplex (TDD) serving cells, taking the FDD serving cells into one group, and taking the TDD serving cells into another group, or
    taking downlink serving cells corresponding to the uplink serving cells of a same Timing Advance Group (TAG) into one group.

5. The method according to claim 1, wherein transmitting the uplink control information to be transmitted corresponding to the downlink serving cells on the uplink subframes according to the determined corresponding relation comprises: selecting the uplink serving cells where the uplink subframes that transmit the uplink control information are located.

6. The method according to claim 5, wherein selecting the uplink serving cells where the uplink subframes that transmit the uplink control information are located comprises: determining the uplink serving cells selected for transmission according to any one of the following cell determination modes:
    mode I: performing determination according to a downlink serving cell where the PDSCH corresponding to the uplink control information is located or the uplink serving cells corresponding to the downlink serving cell group;
    mode II: performing determination according to a downlink serving cell where the DCI corresponding to the PDSCH which corresponds to the uplink control information is located or the uplink serving cells corresponding to the downlink serving cell group;
    mode III: taking the uplink serving cells as the primary serving cells.

7. The method according to claim 1, wherein transmitting the uplink control information corresponding to the downlink serving cells on the uplink subframes according to the determined corresponding relation comprises:

when the uplink control information to be transmitted is an HARQ-ACK, determining an HARQ-ACK to be transmitted according to an existing timing relation and the uplink subframes; or when the uplink control information to be transmitted is an HARQ-ACK, determining an HARQ-ACK to be transmitted according to a new timing relation and the uplink subframes.

8. The method according to claim 7, wherein the new timing relation is that the HARQ-ACK corresponding to the PDSCH on a subframe numbering n of a downlink serving cell is transmitted on an uplink subframe numbering n+k in an uplink subframe group corresponding to a downlink serving cell group where the downlink serving cell is located.

9. The method according to claim 7, wherein the new timing relation is that, for a downlink serving cell of an FDD system, feedback timing is grouped according to uplink subframes in an uplink subframe group corresponding to a downlink serving cell group where the downlink serving cell is located, wherein different downlink subframes in the downlink serving cell group is regrouped according to the uplink subframes in the uplink subframe group corresponding to the downlink serving cell group.

10. The method according to claim 1, wherein transmitting, by the terminal, the uplink control information to be transmitted corresponding to the downlink serving cells on the uplink subframes according to the determined corresponding relation further comprises:

when there are Physical Uplink Shared CHannels (PUSCH) needing to be transmitted of other uplink subframes in the subframe group corresponding to the uplink subframe, and the downlink serving cell corresponding to the uplink serving cell where the uplink subframe is located and the downlink serving cells corresponding to the uplink serving cells where the other uplink subframes are located belong to a same downlink serving cell group, transmitting the uplink control information on the PUSCH, or when there are PUSCH needing to be transmitted of other uplink subframes in the subframe group corresponding to the uplink subframe, and the downlink serving cell corresponding to the uplink serving cell where the uplink subframe is located and the downlink serving cells corresponding to the uplink serving cells where the other uplink subframes are located do not belong to a same downlink serving cell group, transmitting the uplink control information on a Physical Uplink Control CHannel (PUCCH), or when there are PUSCH needing to be transmitted of other uplink subframes in the subframe group corresponding to the uplink subframe, and the downlink serving cell corresponding to the uplink serving cell where the uplink subframe is located and the downlink serving cells corresponding to the uplink serving cells where part of the other uplink subframes are located belong to a same downlink serving cell group, transmitting the uplink control information on the PUSCH, or when there are PUSCH needing to be transmitted of other uplink subframes in the subframe group corresponding to the uplink subframe, configuring, by a signalling, whether the uplink control information is transmitted on the PUCCH or on the PUSCH.

11. A device for transmitting uplink control information, located at the terminal side, comprising:

a grouping unit configured to group uplink subframes in a radio frame into N groups, and group all downlink serving cells into M groups;

a determination unit configured to determine a corresponding relation between the M groups of downlink serving cells and the N groups of uplink subframes; and a transmission unit configured to transmit uplink control information corresponding to the downlink serving cells on the uplink subframes according to the determined corresponding relation, wherein M and N are both positive integers greater than 1, and M is greater than or equal to N, wherein the corresponding relation is determined according to at least one of the following pre-configuration modes:

mode I: the corresponding relation is determined according to a preset corresponding relation;

mode II: the corresponding relation is determined according to a corresponding relation configured by a signalling;

mode III: the corresponding relation is determined according to a corresponding relation between a downlink serving cell group index and an uplink subframe group index;

mode IV: the corresponding relation is determined according to a corresponding relation between the types of the downlink serving cells and the types of the uplink subframes;

mode V: the corresponding relation is determined according to a feedback relation between a subframe on which a Physical Downlink Shared CHannel (PDSCH) of each downlink serving cell is located and a Hybrid Automatic Repeat reQuest Acknowledgement (HARQ-ACK) corresponding to the PDSCH; and wherein the grouping unit comprises a cell grouping subunit configured to, when all downlink serving cells are grouped into M groups, perform grouping according to at least one of the following cell configuration modes;

mode I: grouping is performed according to a backhaul type;

mode II: grouping is performed according to the types of the serving cells; or mode III: grouping is self-adaptively performed according to a transmission situation of the DCI corresponding to the PDSCH of a downlink serving cell.

12. The device according to claim 11, wherein the grouping unit comprises a subframe grouping subunit configured to, when the uplink subframes in the radio frame is grouped into N groups, perform grouping according to at least one of the following group configuration modes:

mode I: grouping is performed according to subframe indexes;

mode II: grouping is performed according to the uplink subframes included in each group indicated by a signalling;

mode III: grouping is performed according to the quantity of the downlink serving cells and/or the types of the downlink serving cells;

mode IV: grouping is performed according to a feedback relation between a subframe where Downlink Control Information (DCI) corresponding to the PDSCH of a downlink serving cell is located and the HARQ-ACK corresponding to the PDSCH.

13. The device according to claim 12, wherein the subframe grouping subunit is further configured to, when grouping is performed according to subframe indexes, perform grouping according to at least one of the following subframe configuration modes:
- mode I: those with odd subframe indexes form one group, and those with even subframe indexes form another group;
- mode II: those with the subframe indexes of the first half frame form one group, and those with the subframe indexes of the second half frame form another group;
- mode III: appointed subframes form one group, and the rest subframes form another group.

14. The device according to claim 11, wherein the cell grouping subunit is further configured to, when grouping is performed according to the types of the serving cells,
- take primary serving cells as one group, and take secondary serving cells as another group, or
- take serving cells corresponding to a same frequency band as one group, or
- when the serving cells are FDD (Frequency Division Duplex) serving cells and TDD (Time Duplex Division) serving cells, take the FDD serving cells as one group, and take the TDD serving cells as another group, or
- take the downlink serving cells corresponding to the uplink serving cells of a same Timing Advance Group (TAG) as one group.

15. The device according to claim 11, wherein the determination unit is further configured to, when uplink control information corresponding to the downlink serving cells is transmitted on the uplink subframes according to the determined corresponding relation, select the uplink serving cells where the uplink subframes that transmit the uplink control information are located.

16. The device according to claim 15, wherein the determination unit is further configured to, when it is selected the uplink serving cells where the uplink subframes that transmit the uplink control information are located, determine the uplink serving cells selected for transmission according to any one of the following cell determination modes:
- mode I: determination is implemented according to a downlink serving cell where the PDSCH corresponding to the uplink control information is located or the uplink serving cells corresponding to the downlink serving cell group;
- mode II: determination is implemented according to a downlink serving cell where the DCI corresponding to the PDSCH which corresponds to the uplink control information is located or the uplink serving cells corresponding to the downlink serving cell group;
- mode III: the uplink serving cells are the primary serving cells.

17. The device according to claim 11, wherein the determination unit is further configured to, when the uplink control information corresponding to the downlink serving cells is transmitted on the uplink subframes according to the determined corresponding relation,
- in the case that the uplink control information to be transmitted is an HARQ-ACK, determine an HARQ-ACK to be transmitted according to an existing timing relation and the uplink subframes; or
- in the case that the uplink control information to be transmitted is an HARQ-ACK, determine an HARQ-ACK to be transmitted according to a new timing relation and the uplink subframes.

18. The device according to claim 17, wherein the new timing relation is that the HARQ-ACK corresponding to the PDSCH on a subframe numbering n of the downlink serving cell is transmitted on an uplink subframe numbering n+k in an uplink subframe group corresponding to a downlink serving cell group where the downlink serving cell is located.

19. The device according to claim 17, wherein the new timing relation is that, for a downlink serving cell of an FDD system, feedback timing is grouped according to uplink subframes in an uplink subframe group corresponding to a downlink serving cell group where the downlink serving cell is located, wherein different downlink subframes in the downlink serving cell group is regrouped according to the uplink subframes in the uplink subframe group corresponding to the downlink serving cell group.

20. The device according to claim 11, wherein the transmission unit is further configured to,
- when there are PUSCH of other uplink subframes needing to be transmitted in the subframe group corresponding to the uplink subframe, and the downlink serving cell corresponding to the uplink serving cell where the uplink subframe is located and the downlink serving cells corresponding to the uplink serving cells where the other uplink subframes are located belong to a same downlink serving cell group, transmit the uplink control information on the PUSCH, or
- when there are PUSCH of other uplink subframes needing to be transmitted in the subframe group corresponding to the uplink subframe, and the downlink serving cell corresponding to the uplink serving cell where the uplink subframe is located and the downlink serving cells corresponding to the uplink serving cells where the other uplink subframes are located do not belong to a same downlink serving cell group, transmit the uplink control information on a Physical Uplink Control CHannel (PUCCH), or
- when there are PUSCH of other uplink subframes needing to be transmitted in the subframe group corresponding to the uplink subframe, and the downlink serving cell corresponding to the uplink serving cell where the uplink subframe is located and the downlink serving cells corresponding to the uplink serving cells where part of the other uplink subframes are located belong to a same downlink serving cell group, transmit the uplink control information on the PUSCH, or
- when there are PUSCH of other uplink subframes needing to be transmitted in the subframe group corresponding to the uplink subframe, it is configured through a signalling whether the uplink control information is transmitted on the PUCCH or on the PUSCH.

21. A device for receiving uplink control information, located at a base station side, comprising:
- a grouping configuration unit configured to group uplink subframes in a radio frame into N groups, and group all downlink serving cells into M groups;
- a corresponding relation configuration unit configured to determine a corresponding relation between the M groups of downlink serving cells and the N groups of uplink subframes; and
- a receiving unit configured to receive uplink control information corresponding the downlink serving cells on the uplink subframes according to the determined corresponding relation, wherein M and N are both positive integers greater than 1, and M is greater than or equal to N,
- wherein when the determination unit is configured to determine a corresponding relation between the M groups of downlink serving cells and the N groups of uplink subframes, the corresponding relation is determined according to at least one of the following pre-configuration modes:

mode I: the corresponding relation is determined according to a preset corresponding relation;

mode II: the corresponding relation is determined according to a corresponding relation configured by a signalling;

mode III: the corresponding relation is determined according to a corresponding relation between a downlink serving cell group index and an uplink subframe group index;

mode IV: the corresponding relation is determined according to a corresponding relation between the types of the downlink serving cells and the types of the uplink subframes;

mode V: the corresponding relation is determined according to a feedback relation between a subframe on which a Physical Downlink Shared CHannel (PDSCH) of each downlink serving cell is located and a Hybrid Automatic Repeat reQuest Acknowledgement (HARQ-ACK) corresponding to the PDSCH;

wherein the grouping configuration unit is configured to group the all downlink serving cells into the M groups according to at least one of the following cell configuration modes:

mode I: grouping according to a backhaul type;

mode II: grouping according to the types of the serving cells; or mode III: self-adaptively grouping according to a transmission situation of the DCI corresponding to the PDSCH of a downlink serving cell.

* * * * *